United States Patent [19]
Sugiyama et al.

[11] Patent Number: 5,868,134
[45] Date of Patent: Feb. 9, 1999

[54] RETINAL DISEASE ANALYZER

[75] Inventors: Akihiro Sugiyama; Takuya Moriyama; Hiroshi Ichiki, all of Tokyo, Japan

[73] Assignee: Kabushiki Kaisha Topcon, Tokyo, Japan

[21] Appl. No.: 632,716

[22] Filed: Apr. 15, 1996

Related U.S. Application Data

[63] Continuation of Ser. No. 309,755, Sep. 21, 1994, abandoned.

[30] Foreign Application Priority Data

| Sep. 21, 1993 | [JP] | Japan | 5-259088 |
| Sep. 21, 1993 | [JP] | Japan | 5-259089 |
| Sep. 21, 1993 | [JP] | Japan | 5-259090 |

[51] Int. Cl.$^6$ ............................................. A61B 5/00
[52] U.S. Cl. .................................................... 128/630
[58] Field of Search ............................. 128/630, 653.1, 128/645, 654, 745, 665, 897, 898; 351/200, 206, 211

[56] References Cited

U.S. PATENT DOCUMENTS

| 5,058,596 | 10/1991 | Makino et al. | 128/745 X |
| 5,125,730 | 6/1992 | Taylor et al. | 351/206 |
| 5,233,517 | 8/1993 | Jindra | 128/745 X |
| 5,270,924 | 12/1993 | Hideshima | 364/413.13 |
| 5,303,709 | 4/1994 | Dreher et al. | 128/745 X |

*Primary Examiner*—Jennifer Bahr
*Assistant Examiner*—Samuel Gilbert
*Attorney, Agent, or Firm*—Brumbaugh, Graves, Donohue & Raymond

[57] ABSTRACT

A retinal disease analyzer processes data obtained by processing a color retinal image and measured visual field data provided by a perimeter to detect the condition of the optic disc and defects in the nerve fiber bundles for the clinical analysis of the condition of the optic disc and the defects in the nerve fiber bundles, and combines detected information on a fundus coordinate system taking into consideration the arrangement of the nerve fiber bundles for the comprehensive analysis of the condition and the degree of progress of glaucoma. The detected information is analyzed on the basis of the distribution pattern of the nerve fiber bundles or the corresponding fundus coordinate system to integrate all the data for analysis. The condition and the degree of progress of glaucoma can be determined on the basis of the integrated data.

17 Claims, 40 Drawing Sheets

(A:AUTOMATIC FUNDUS COORDINATE SYSTEM SETTING PROCEDURE

OPTIC DISC DETECTION

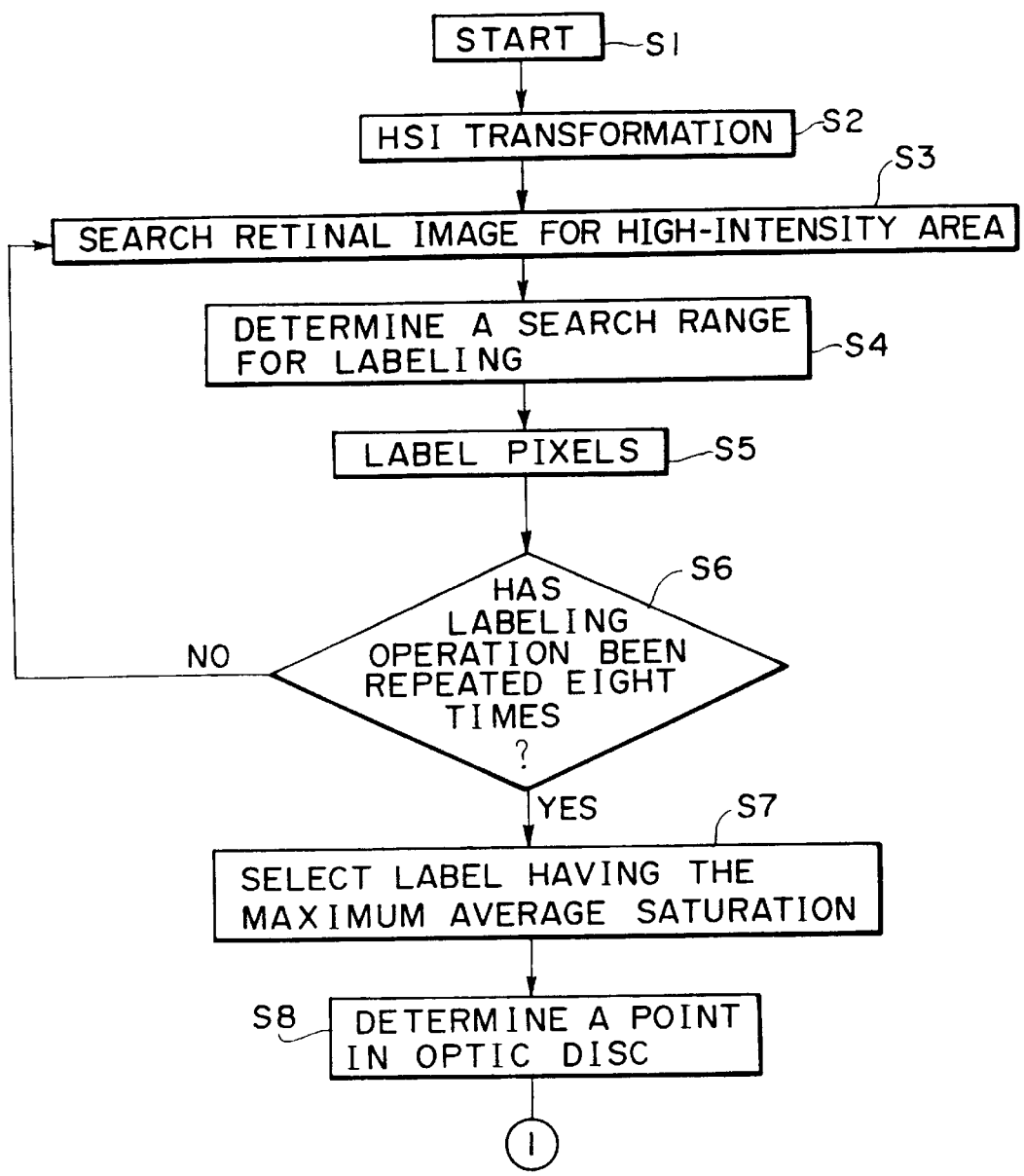

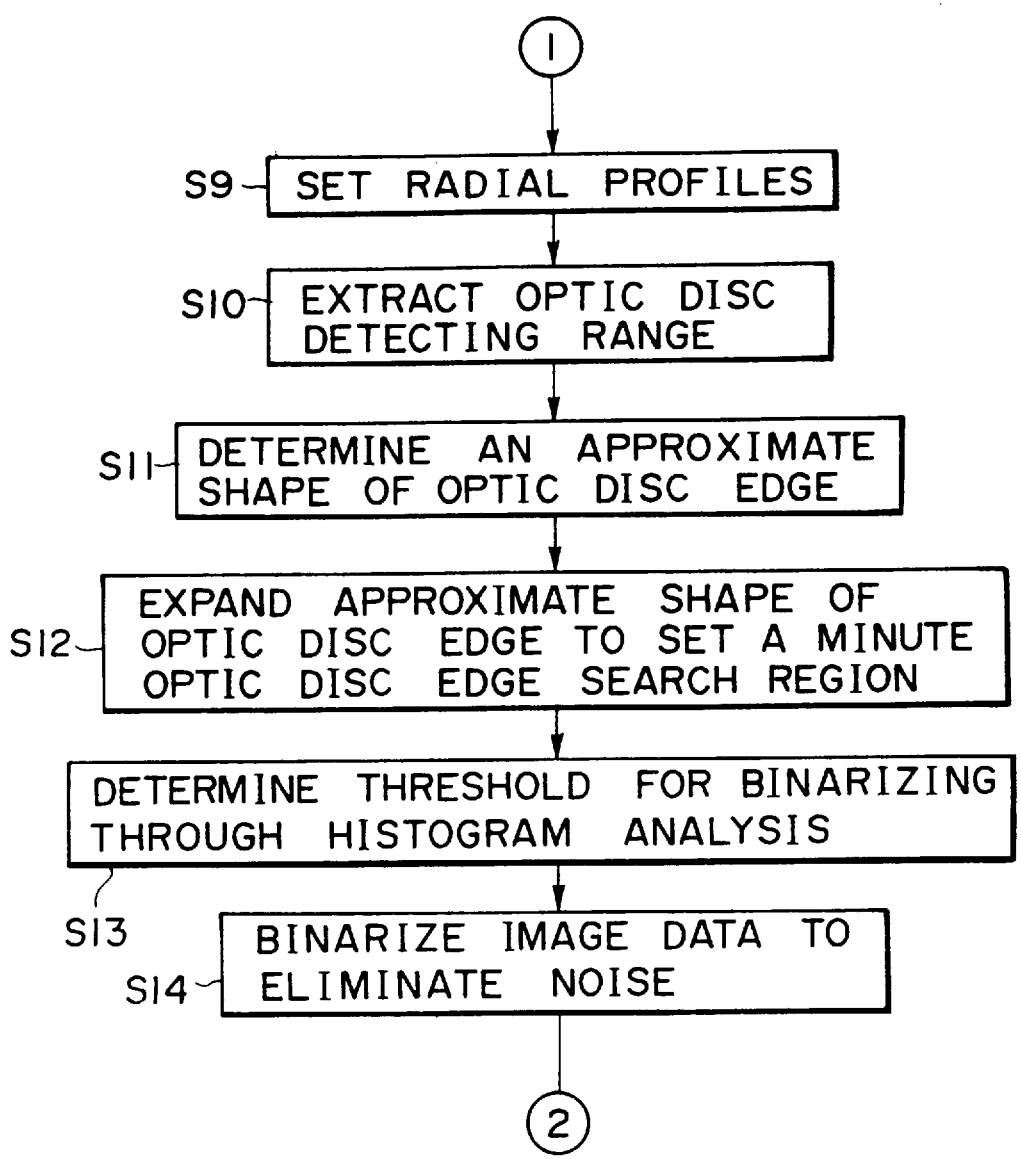

| INTENSITY | 10 | 10 | 10 | 4 | 10 | 11 | 8 | 5 | 2 | 3 | 3 |
|---|---|---|---|---|---|---|---|---|---|---|---|
| DIFFERENTIAL | 0 | 0 | -6 | 6 | 1 | -3 | -3 | -3 | 1 | 0 | |
| DROP | | -6 | | 0 | 0 | | -9 | | 0 | 0 | |

FIG. 13 b b b
· a ·
b b b a: OBJECT PIXEL b: DIRECTION OF TRACKING PIXEL (B: AUTOMATIC PALLOR ANALYZING PROCEDURE)

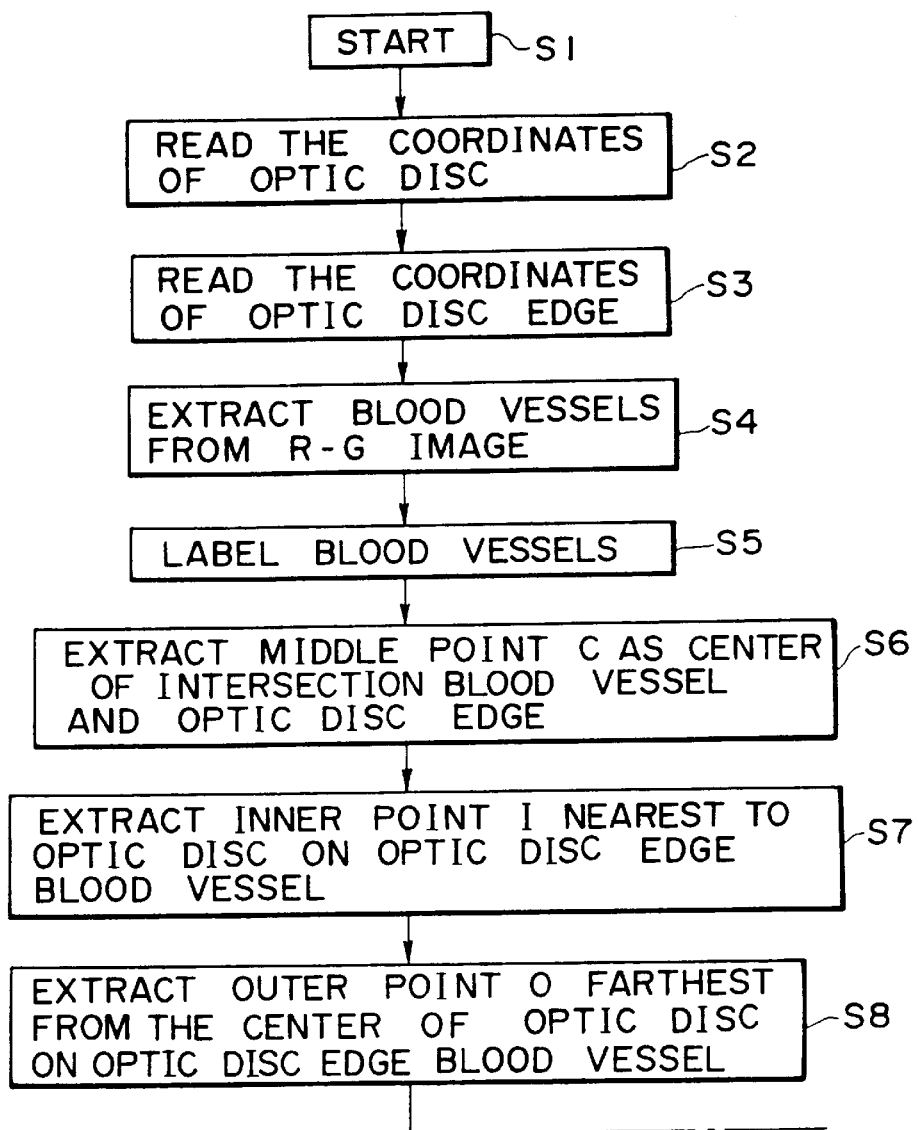

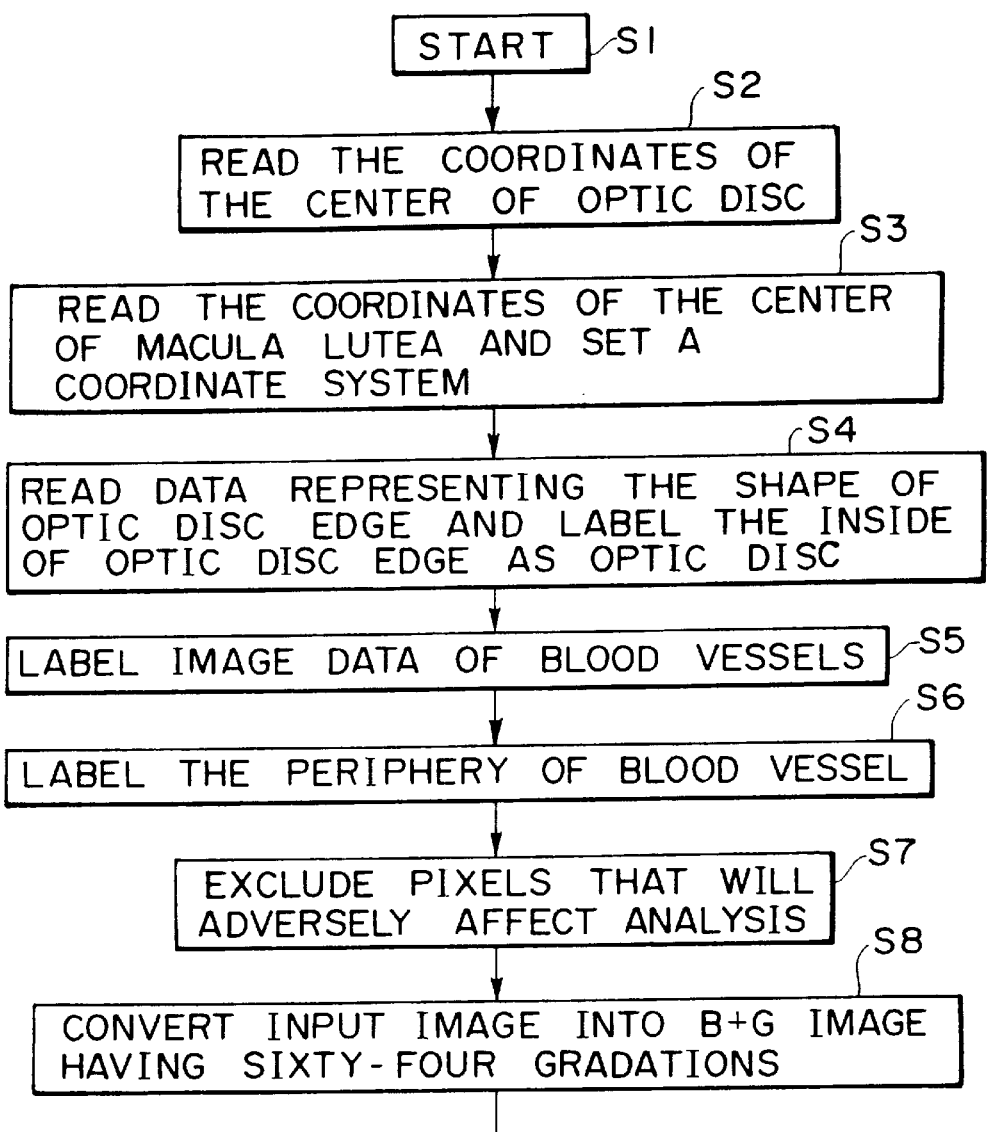

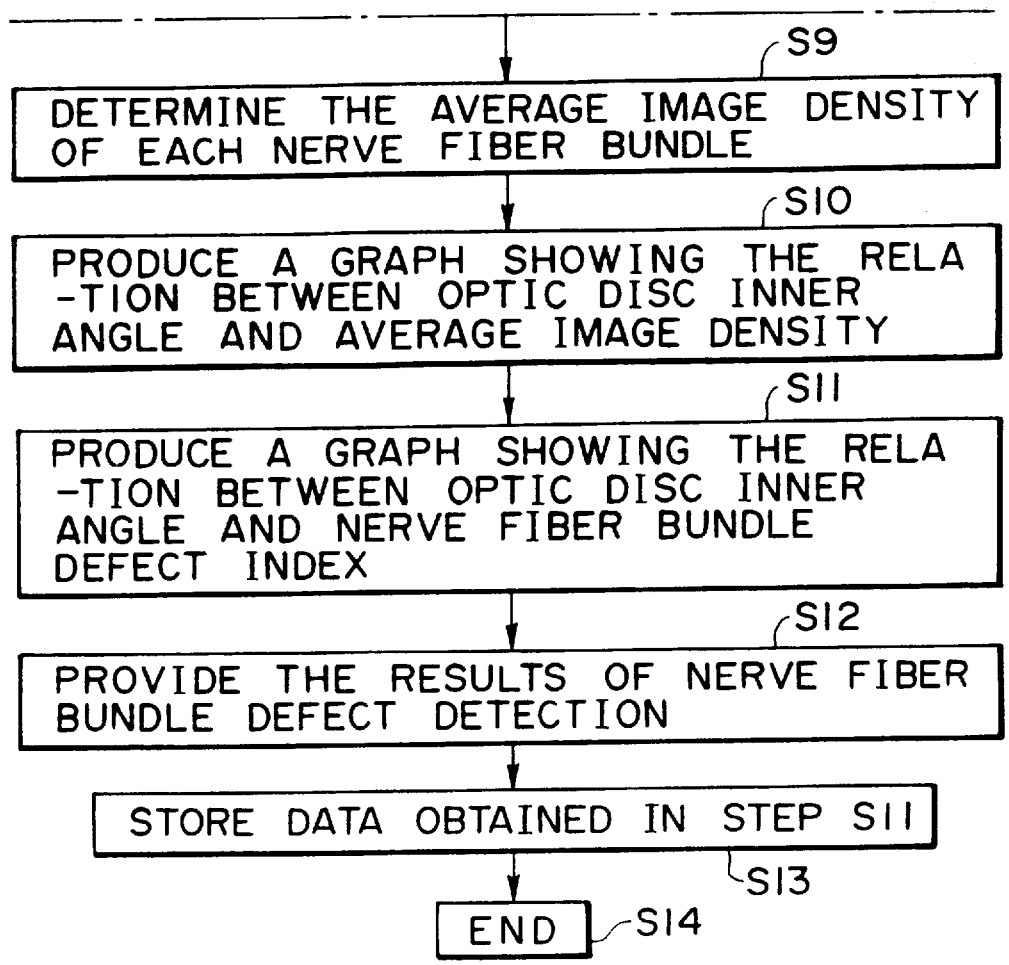

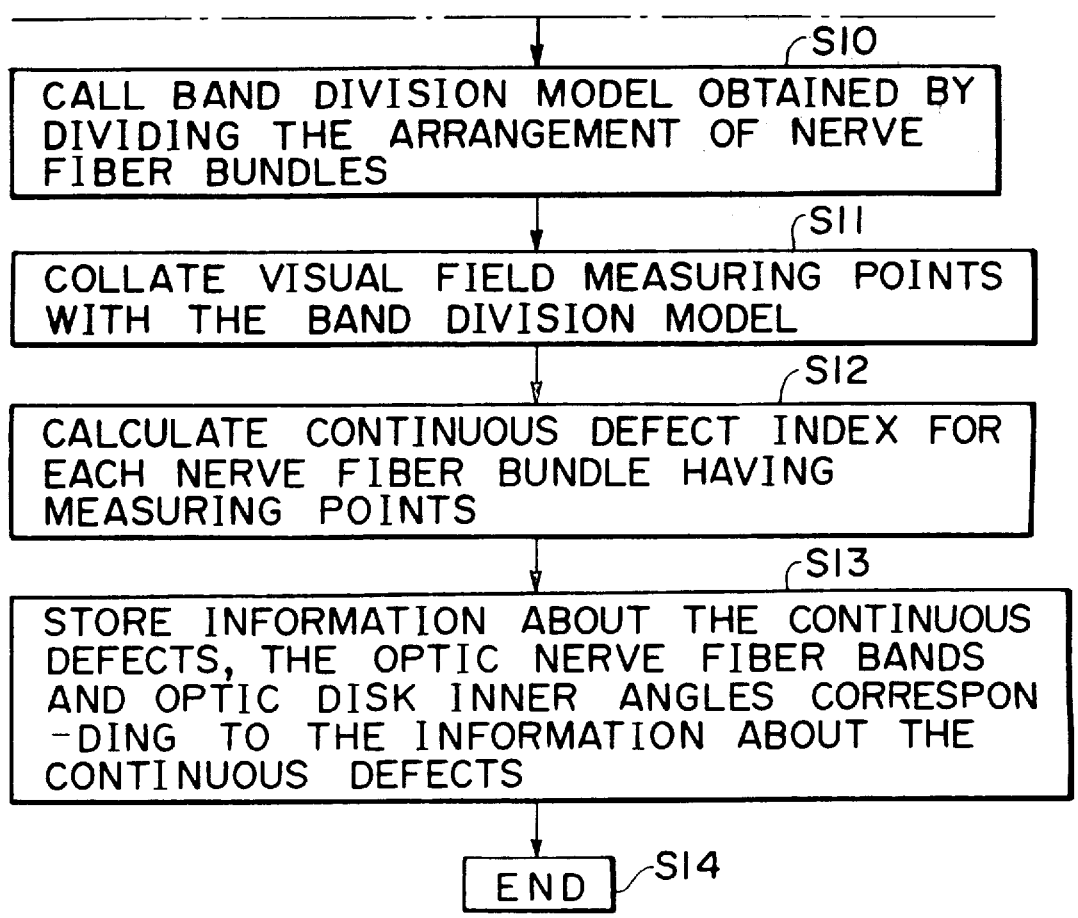

RETINAL DISEASE ANALYZER

This is a continuation of application Ser. No. 08/309,755 filed Sep. 21, 1994, now abandoned.

FIELD OF THE INVENTION

The present invention relates to a fundus disease analyzer and, more particularly, to a retinal disease analyzer for detecting the condition and progress of a retinal disease such as glaucoma.

BACKGROUND OF THE INVENTION

The number of patients suffering from glaucoma has increased sharply in recent years. Most patients who become aware of glaucomatous symptoms and see an ophthalmologist are found to be in the final stage of glaucoma and, in most cases, 80% or more of the optic nerve fibers of those patients have exfoliated.

The eyeball is filled with vitreous body and aqueous humor, and the shape of the eyeball is maintained by the pressure of the aqueous humor, i.e., by intraocular tension. The intraocular tension must be in a physiologically appropriate range. If the intraocular tension is excessively high, the circulation of the aqueous humor is obstructed or the optic nerves are under pressure and are caused to atrophy. Glaucoma is a functional illness resulting from excessively high pressure within the eyeball which entails a considerably high probability of loss of sight.

The prevention of optic nerve impairment and the suppression of progress of optic nerve impairment are important therapeutic objectives in the treatment of glaucoma. The diagnosis of the symptoms of glaucoma in the earliest possible stage of functional impairment and appropriate management and therapy are essential to achieve such objectives.

An abnormal intraocular tension and abnormalities in the retina and in the visual field and the like are typical symptoms of glaucoma. Symptoms are diagnosed on the basis of information obtained by integrating measurements of intraocular tension, examination of the retina, and tests of visual functions including the visual field to identify glaucoma in the early stages of progress.

To improve the accuracy of examination, a known glaucoma analyzer determines parameters including the C/D ratio, i.e., the ratio of optic cup diameter to optic disc diameter, indicating the size of the optic disc recess, the average recess in the optic cup, and the vertical, transverse and diagonal widths of the rim on the basis of the results of three-dimensional measurement of the optic disc on the retina. The parameters are applied to a neural network to estimate defects in the visual field and the degree of progress of glaucoma.

To accurately know the defects of nerve fiber bundles, it is necessary to conduct full mydriasis, irradiate the retina brightly, accurately focus on the nerve fiber bundles, strengthen the reflected information from the nerve fiber bundles, and make a contrast with the information.

Conventionally, glaucoma patients are distinguished from healthy people by taking a red-free retina photograph, calculating the gradation density of the nerve fiber bundles on the vertical line near the center of the macula lutea-optic disc line or around the optic disc by using computer processing or the like, and comparing these data with data from healthy people.

Since the simple C/D ratio is not a sufficiently effective parameter, another glaucoma analyzer relies on the fact that the nerve fiber bundles occupy specific areas on the optic disc. This type of analyzer sets a fixed optic disc quantity pattern, compares the image of the optic disc on the retina obtained by direct observation or by photograph with the fixed optic disc quantity pattern, and diagnoses the degree of progress of glaucoma on the basis of the comparison and information about defects in the nerve fiber bundles.

The optic disc is divided into twelve sectors according to the arrangement of the optic nerve fibers. A red-free retinal photograph is read by a digitizer. The area of the optic disc and that of the optic disc recess are determined. The C/D·A ratio (the ratio of the area of optic disc cupping) is calculated. The obtained information is examined to estimate the degree of progress of glaucoma.

Since these known glaucoma analyzers analyze the optic disc or the nerve fiber bundles individually or locally, they are incapable of achieving comprehensive analysis and diagnosis of glaucoma in comparison to doctors, who analyze and diagnose glaucoma on the basis of integrated information about the optic disc, the retina and the visual field.

Since these known glaucoma analyzers are not provided with any computing system for automatically processing all the data including those of the optic disc, the retina and the visual field, these known glaucoma analyzers must carry out a troublesome operation to read the red-free retinal photograph by the digitizer. Such an analyzing procedure is quite inefficient, and the reproduceability of data acquired by this analyzing procedure is not satisfactory.

The nerve fiber bundle defect on the retina is one of the conditions symptomatic of glaucoma. Since the reflectance of the defective portion of the retina in which defects are found in the nerve fiber bundles is lower than that of the normal portion of the retina, the defective portion appears in a wedge-shaped dark streak on a retinal photograph. Nerve fiber bundle defects extend outward from the optic disc in curves along the arrangement of optic nerves. Thus, the optic nerve fiber bundle defects extend radially from the optic disc and curve sharply near the macula lutea.

A first known method of detecting defects in optic nerve fibers involves scanning a red-free retinal photograph to determine the density level along a fixed straight line or along radial lines extending from the optic disc. When the density of a specific area within the scanned area is lower than an expected density, a portion of the retina corresponding to this specific area is regarded as a defective portion.

More specifically, a picture is scanned linearly to detect defects in the optic nerve fibers through the measurement of the density of the picture along a straight scanning line which is the perpendicular bisector of a line segment between the optic disc and the fovea centralis. A density distribution in an angular range of 30° corresponding to a visual field about the intersection of the line segment and the perpendicular bisector is analyzed, and the results of the analysis are compared with corresponding data for an age bracket in which the subject is included.

A second known method of detecting defects in nerve fiber bundles involves scanning an area around the optic disc in a retinal image along radial scanning lines extending in different directions from the optic disc. A direction in which defects in the nerve fiber bundles exist is determined on the basis of cumulative densities respectively on the radial scanning lines. The cumulative density data obtained by scanning is plotted in a linear graph in which directions from the optic disc are measured on the abscissa axis and the cumulative densities are measured on the ordinate axis.

Then, the linear graph is searched for a minimal point, and it is decided that lesions exist in the direction corresponding to the minimal point. Since it is possible that blood vessels are mistaken for lesions, the prior discrimination of the directions in which blood vessels are expected to exist from other directions are made beforehand to prevent the misidentification of hollows in the graph corresponding to the blood vessels and lesions.

Since the first known method, which involves scanning the retinal image along a linear scanning line to detect defects in the optic nerve fibers, analyzes the retinal image locally for defects in the nerve fiber bundles, lesions existing in areas other than the scanned area cannot be found thereby. Since the second known method, which involves scanning the retinal image along radial lines radiating from the optic disc, scans only an area around the optic disc, the divergence between the shapes of defects in the nerve fiber bundles and the scanned area increases if the scanning area is expanded, resulting in reduced measuring accuracy.

When measuring the visual field, importance is attached to the Bjerrum area and the nasal step rather than to an area around the optic disc. Data representing direction and distance from the optic disc is effective in specifying a portion corresponding to the Bjerrum area and the nasal step on the retina. Therefore, there has been a strong demand for a retinal disease analyzer capable of acquiring such data and of accurately specifying an area on the retina in which loss of visual field is likely to occur, taking the shapes of optic nerves into consideration. It has also been desired to make a comprehensive determination of the direction of expansion of the pallor, the curvature of the blood vessel around the edge of the optic disc and defects in the nerve fiber bundles, which appear along the optic nerve fiber distribution pattern.

Typically, ophthalmologists have determined the positions and sizes of defects in the retina quantitatively by rough estimation.

A further known method of detecting defects in nerve fiber bundles involves measuring the optic disc by a manual measuring operation and determining the position of the optic disc by an automatic measuring operation. A point having maximum values for $r(\lambda)$, $g(\lambda)$ and $b(\lambda)$ is within a portion of a retinal image corresponding to the optic disc. Therefore, in the automatic measurement of the optic disc, a specific point having maximum values for $r(\lambda)$, $g(\lambda)$ and $b(\lambda)$ is detected. Values of points above, below, on the right side and on the left side of the specific point for $r(\lambda)$, $g(\lambda)$ and $b(\lambda)$ are compared with the maximum values of the specific point, and a point at which the difference between the maximum values of the specific point and the values of the point exceeds a threshold is regarded as a point corresponding to the optic disc.

This known retinal disease analyzing method is incapable of automatically detecting the optic disc and the macula lutea in the retinal image and of automatically determining coordinates. Manual determination of coordinates is quite inefficient and unreliable.

Accordingly, there has been a strong demand for a retinal disease analyzer capable of precise determination of the arrangement of the optic nerve fibers and of using frequencies of diseases to determine regions in the eye.

SUMMARY OF THE INVENTION

The condition and progress of a fundus or retinal disease, such as glaucoma, can be analyzed through detection of the condition of the optic disc and of nerve fiber bundle defects by medical analysis and image processing of color fundus images and from measurement data measured with a perimeter, with the integrated findings so obtained being composed on a fundus coordinate system taking into account the arrangement of the nerve fiber bundles.

The condition and progress of a retinal disease, such as glaucoma, can be analyzed also through integration of all the data, by analyzing detected data in connection with the nerve fiber bundles or a distribution pattern of the nerve fiber bundles on a retina coordinate system.

In a preferred embodiment, an extracting unit determines the respective positions of the macula lutea and the optic disc from retinal image data. A fundus coordinate system setting unit sets a fundus coordinate system on the basis of the respective extracted positions of the macula lutea and the optic disc and a predetermined distribution pattern of the nerve fiber bundles. A visual data transforming unit transforms the given measured visual field data on the fundus coordinate system. A defect extracting unit extracts defects caused by retinal disease from the retinal image data. An analyzing unit connects the visual field data with the defects on the fundus coordinate system and analyses the retinal disease.

Further in a preferred embodiment, a feature extracting unit determines the respective positions of the macula lutea and the optic disc from retinal image data. A nerve fiber bundle distribution pattern forming unit determines the distribution pattern of the subject's nerve fiber bundles on the basis of the respective extracted positions of the macula lutea and the optic disc. A visual field data transforming unit transforms the given measured visual field data on the fundus coordinate system. A defect extracting unit extracts defects caused by the retinal disease from the retinal image data. An analyzing unit connects the visual field data with the defects on the basis of the nerve fiber bundle distribution pattern and analyzes the retinal disease.

The defect extracting unit can be constructed so as to extract the pallor from the retinal image data to determine the distribution of the dislocation of the pallor, to determine the curvature of the blood vessels on the basis of the retinal image data of a region around the optic disc edge, to determine the average density of portions along the nerve fiber bundles from the retinal image data, and to determine the nerve fiber bundle defect indices.

The present invention thus constituted enables the comprehensive evaluation of the individually determined measured visual field data and the defects in the retinal image data on the basis of the fundus coordinate system or the distribution pattern of the subject's nerve fiber bundles to assist the ophthalmologist in diagnosing glaucoma or the like.

Further in a preferred embodiment, a feature extracting unit determines the respective positions of the macula lutea and the optic disc on the basis of the retinal image data of the subject. A fundus coordinate system setting unit sets the fundus coordinate system on the basis of the respective extracted positions of the macula lutea and the optic disc and the predetermined distribution pattern of the nerve fiber bundles. A defect extracting unit extracts defects caused by retinal disease from the retinal image data on the basis of the respective fundus coordinate system. An analyzing unit analyzes the retinal disease on the basis of the extracted defects.

Further in a preferred embodiment, a feature extracting unit determines the respective positions of the macula lutea and the optic disc from the retinal image data of the subject. A nerve fiber bundle distribution pattern forming unit forms the distribution pattern of the subject's nerve fiber bundles on the basis of the respective positions of the macula lutea and the optic disc extracted from the retinal image data. A defect extracting unit extracts defects caused by the retinal disease from the retinal image data on the basis of the nerve fiber bundle distribution pattern. An analyzing unit analyzes the retinal disease on the basis of the extracted defects.

Further in a preferred embodiment, a feature extracting unit determines the respective positions of the macula lutea and the optic disc from the retinal image data of the subject. A fundus coordinate system setting unit sets the fundus coordinate system on the basis of the respective positions of the macula lutea and the optic disc and the predetermined nerve fiber bundle distribution pattern. A defect extracting unit extracts defects caused by the retinal disease from the retinal image data. An analyzing unit brings the plurality of extracted defects extracted by the defect extracting unit into connection with each other on the fundus coordinate system and analyzes the retinal disease.

Further in a preferred embodiment, a feature extracting unit determines the respective positions of the macula lutea and the optic disc from the retinal image data of the subject. A fundus coordinate setting unit sets the fundus coordinate system on the basis of the respective positions of the macula lutea and the optic disc and the predetermined nerve fiber bundle distribution pattern. A defect extracting unit extracts defects caused by the retinal disease from the retinal image data. An analyzing unit brings the plurality of extracted defects extracted by the defect extracting unit into connection on the fundus coordinate system and analyzes the retinal disease.

Further in a preferred embodiment, a feature extracting unit determines the respective positions of the macula lutea and the optic disc nerve fiber bundle distribution from the retinal image data of the subject. An optic nerve fiber distribution pattern forming unit forms the distribution pattern of the subject's nerve fiber bundles on the basis of the respective positions of the macula lutea and the optic disc extracted from the retinal image data. A defect extracting unit extracts defects caused by the retinal disease from the retinal image data. An analyzing unit brings the plurality of defects extracted by the defect extracting unit into connection with each other an the basis of the nerve fiber bundle distribution and analyzes the retinal disease.

The present invention thus constituted is capable of detecting defects caused by the retinal disease (defects in the nerve fiber bundles) on the basis of the distribution pattern of the subject's nerve fiber bundles. The plurality of defects caused by the retinal disease, such as the data of the pallor and the like, the curvature of the blood vessels extending around the optic disc edge, and defects in the nerve fiber bundles and the like, can be combined on the basis of the nerve fiber bundle distribution on the fundus coordinate system for the comprehensive diagnosis of glaucoma or to assist the ophthalmologist in diagnosing glaucoma.

Further in a preferred embodiment, a feature extracting unit determines the respective positions of the macula lutea and the optic disc from the retinal image data of the subject. A fundus coordinate system setting unit sets the fundus coordinate system on which the retinal image data is shown, on the basis of the respective positions of the macula lutea and the predetermined nerve fiber bundle distribution pattern.

Further in a preferred embodiment, a feature extracting unit determines the respective positions of the macula lutea and the optic disc from the retinal image data. A nerve fiber bundle distribution pattern forming unit forms the distribution pattern of the subject's nerve fiber bundles on the basis of the respective extracted positions of the macula lutea and the optic disc.

Further in a preferred embodiment, a feature extracting unit extracts the image of the blood vessels, and extracts a position on which the blood vessels converge as the position of the optic disc.

The feature extracting unit may determine changes in tone with reference to the tone of the image of the optic disc, and may extract a circular range where the changes in tone decrease linearly as with the macula lutea.

Further in a preferred embodiment, a fundus coordinate system setting unit selects the center of the optic disc as the origin of a coordinate system and sets a retinal curvilinear coordinate system by scaling the predetermined nerve fiber bundle distribution pattern according to the respective positions of the macula lutea and the optic disc.

As a glaucoma analyzer in accordance with the present invention comprises the feature extracting unit that determines the respective positions of the macula lutea and the optic disc from the retinal image data of the subject, and the fundus coordinate system setting unit that sets the fundus coordinate system on which the retinal image data is shown, on the basis of the respective extracted positions of the macula lutea, the optic disc, and the predetermined nerve fiber bundle distribution pattern, the fundus coordinate system can be automatically set on the basis of these extracted features. The analysis of the retinal image data and the line on the fundus coordinate system enables comprehensive diagnosis.

As a glaucoma analyzer in accordance with the present invention comprises the feature extracting means (that determines the respective positions of the macula lutea and the optic disc from the retinal image data of the subject) and the nerve fiber bundle distribution pattern forming unit (that forms the distribution pattern of the subject's nerve fiber bundles on the basis of the respective extracted positions of the macula lutea and the optic disc), the distribution pattern of the subject's nerve fiber bundles can be automatically determined on the basis of the respective positions of the macula lutea and the optic disc. Comprehensive diagnosis can be made on the basis of the analysis of the retinal image data and the like according to the distribution pattern of the nerve fiber bundles.

The present invention is capable of normalizing color image data, comparing the data with that provided by other measuring apparatus, and observing the change of the retinal disease over time with a high degree of accuracy.

The present invention is also capable of enhancing the reliability of the data representing the positions of defects in nerve fiber bundles through the comparative examination of the retinal image data and the visual field data provided by the perimeter.

BRIEF DESCRIPTION OF THE DRAWINGS

FIG. 13 is a view which is helpful in describing a line tracking operation of the glaucoma analyzer of FIG. 1.

FIGS. 21(A) and 21(B) constitute a flow chart of an automatic blood vessel curvature analyzing procedure for determining the curvature of a blood vessel around the edge of the optic disc to be carried out by the glaucoma analyzer of FIG. 1.

FIG. 23($b$) is a flow chart of a sub-procedure within the automatic nerve fiber bundle defect analyzing procedure of FIGS. 23($a$)(A) and 23($a$)(B) to be carried out by the glaucoma analyzer of FIG. 1.

FIG. 34($b$) is a picture of the fundus.

DETAILED DESCRIPTION OF PREFERRED EMBODIMENTS

A glaucoma analyzer 1000 in a preferred embodiment according to the present invention will be described hereinafter with reference to the accompanying drawings.

The glaucoma analyzer, i.e., a retinal disease analyzer, processes retinal image data and visual field data obtained by examining the subject's eyeball, to assist ophthalmologists in making a comprehensive diagnosis of glaucoma.

Figure 1:
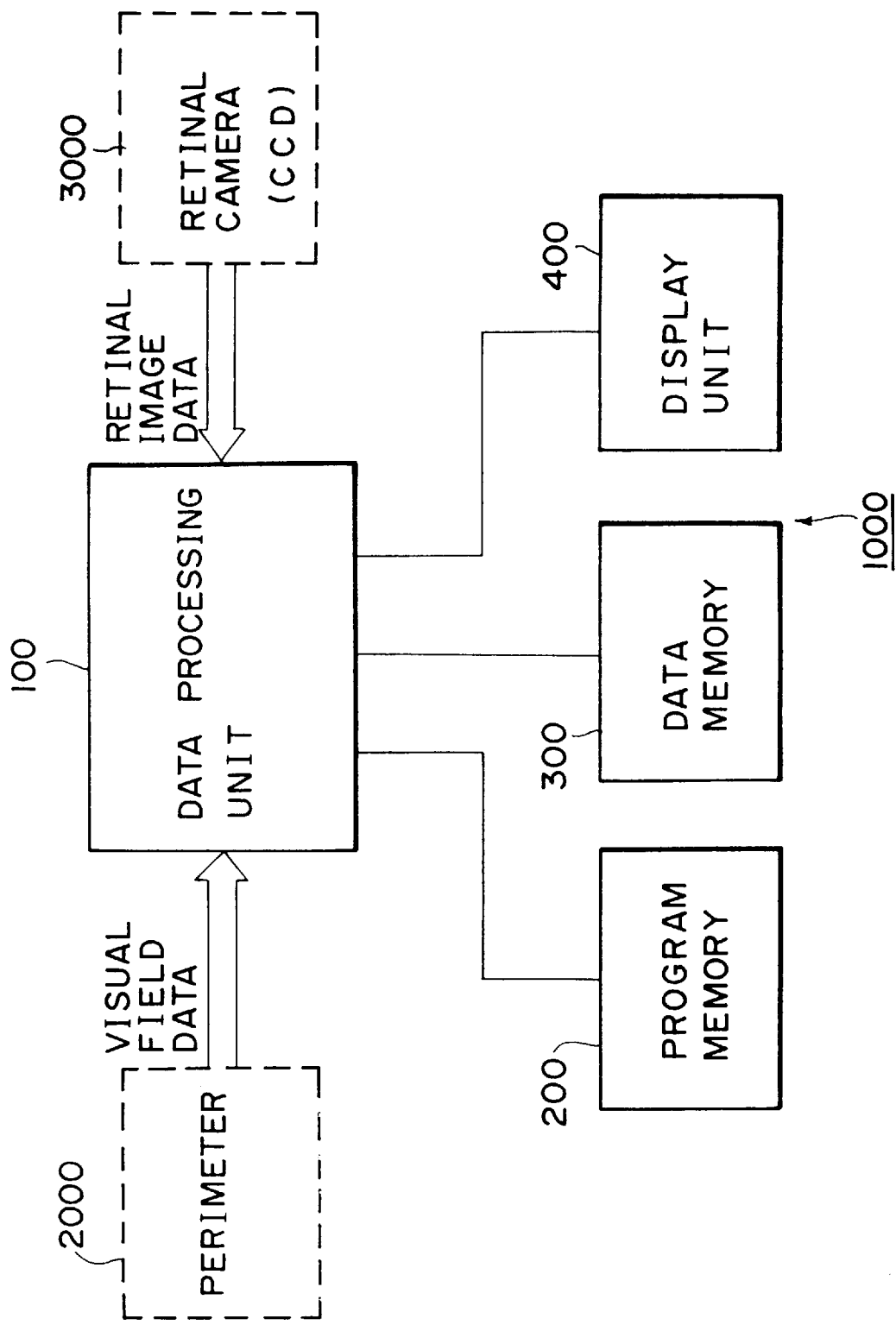
FIG. 1 is a block diagram of a glaucoma analyzer in a preferred embodiment according to the present invention.

Referring to FIG. 1, the glaucoma analyzer 1000 comprises, as principal components, a data processing unit 100, a program memory 200 connected to the data processing unit 100, a data memory 300 connected to the data processing unit 100, and a display unit 400 connected to the data processing unit 100. A perimeter 2000 and a retinal camera 3000 are connected to the data processing unit 100.

Figure 2:
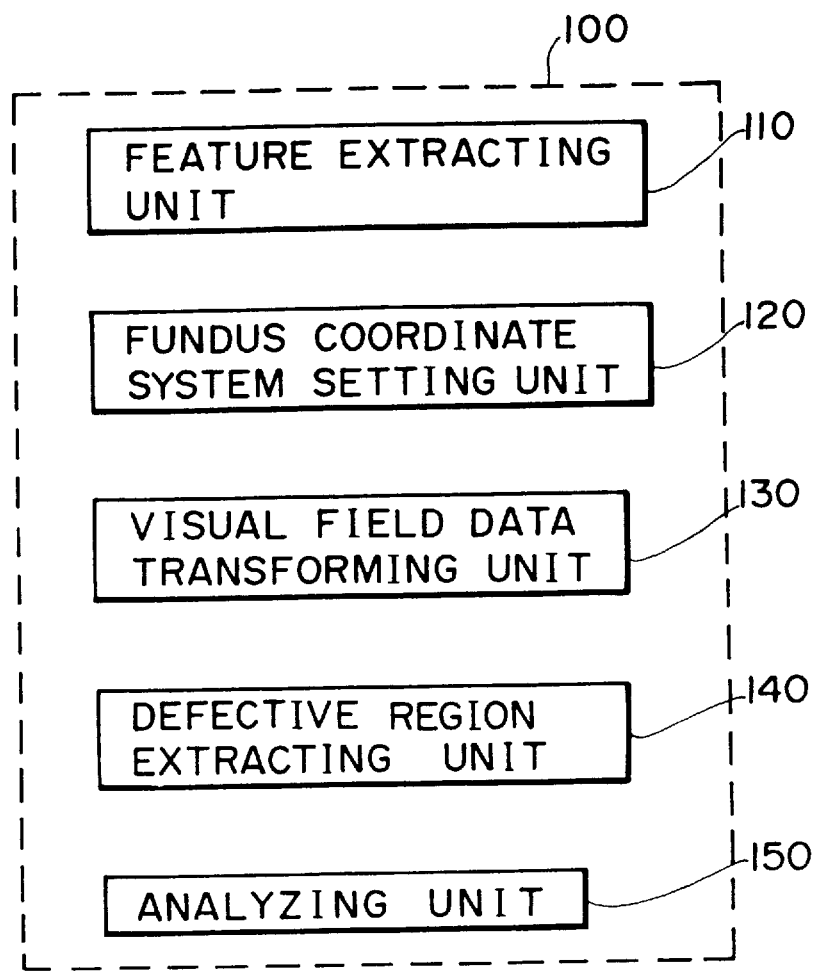
FIG. 2 is a block diagram of a data processor included in the glaucoma analyzer of FIG. 1.

As shown in FIG. 2, the data processing unit 100 comprises a feature extraction unit 110 for determining the respective positions of the macula lutea and the optic disc on the basis of a retinal image. A fundus coordinate system setting unit 120 sets a fundus coordinate system on the basis of a predetermined distribution pattern of nerve fiber bundles and the respective positions of the macula lutea and the optic disc. A visual data transforming unit 130 transforms measured visual field data on the basis of the fundus coordinate system. A defective region extracting unit 140 extracts defective regions from retinal image data. An analyzing unit 150 correlates the visual field data and the featuring region on the basis of the fundus coordinate system and analyzing retinal diseases.

CONSTITUTION OF THE GLAUCOMA ANALYZER

A. Automatic Fundus Coordinate System Setting Procedure

The automatic fundus coordinate system setting procedure includes three procedures, namely an optic disc detecting procedure, a macula lutea detecting procedure and a fundus coordinate system setting procedure.

Figure 3:
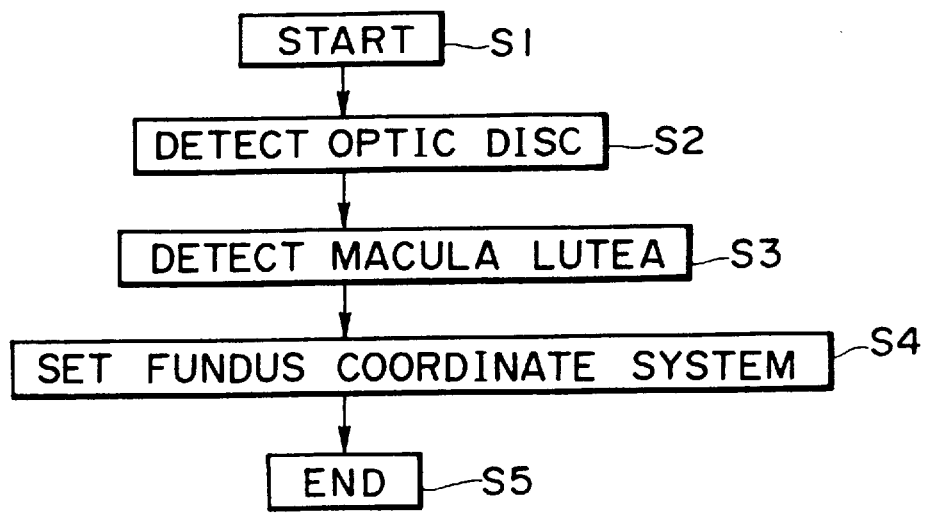
FIG. 3 is a flow chart of an automatic fundus coordinate system setting procedure to be carried out by the glaucoma analyzer of FIG. 1.
Figure 4:
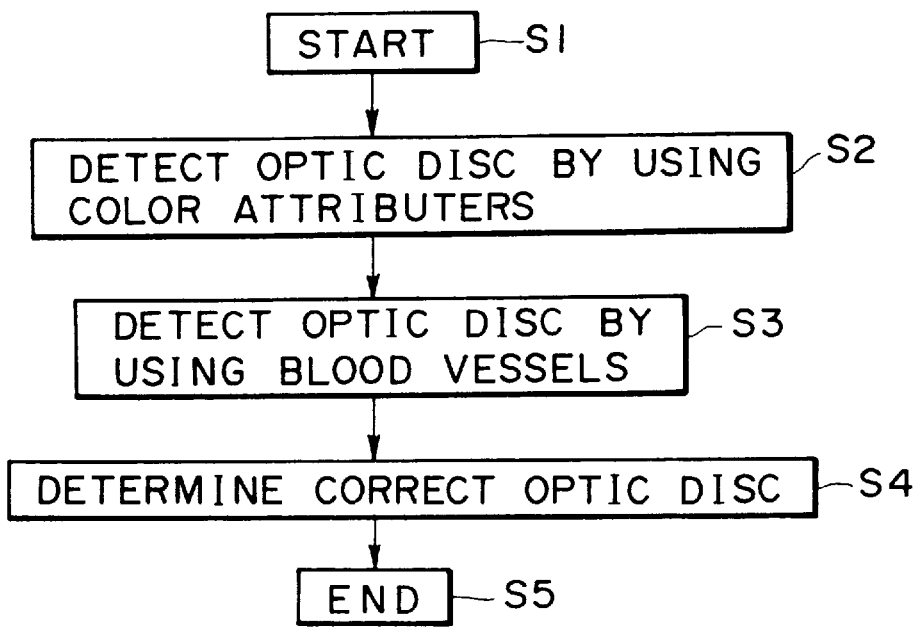
FIG. 4 is a flow chart of an optic disc detecting procedure to be carried out by the glaucoma analyzer of FIG. 1.
Figure 14:
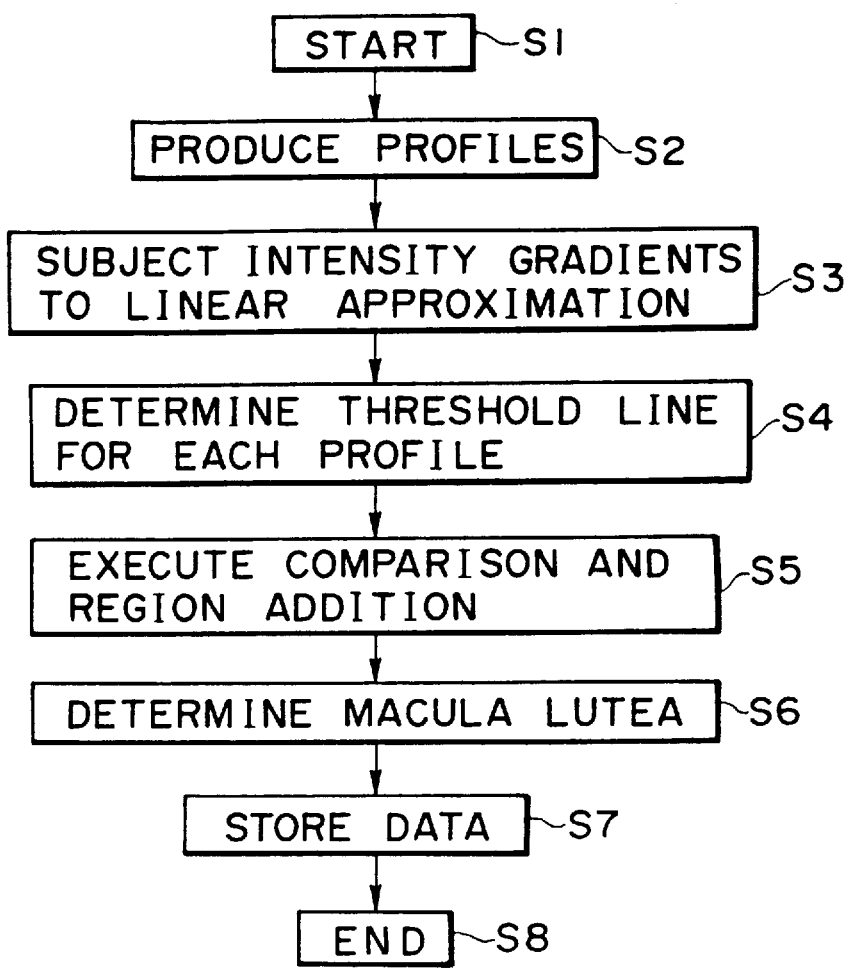
FIG. 14 is a flow chart of a macula lutea detecting procedure to be carried out by the glaucoma analyzer of FIG. 1.

Referring to FIG. 3, a fundus coordinate system setting procedure starts in step S1. The optic disc is detected in step S2 (FIG. 4). The macula lutea is detected in step S3 (FIG. 14). A fundus coordinate system is set in step S4 and the procedure ends in step S5.

(1) optic Disc Detection (Step S2, FIG. 3)

Referring to FIG. 4 which shows an optic disc detecting procedure, the procedure starts in step S1. The optic disc is detected by using color attributes in step S2. The optic disc is detected by using longitudinal blood vessels in step S3. The results of detection in steps S2 and S3 are compared in step S4 to determine whether the optic disc is detected correctly. If portions of optic disc regions detected respectively in steps S2 and S3 overlap each other, the optic disc region detected in step S2 using color attributes is considered correct, and data representing the optic disc region is stored. If the optic disc regions detected in steps S2 and S3 do not overlap each other at all, an analyst observes the images of those optic disc regions on a screen to determine which of those optic disc regions is correct. The comparison of these optic disc regions and selection of correct optic disc regions in step S4 makes the results of detection more reliable. The optic disc detecting procedure ends in step S5.

(i) Optic Disc Detection Using Colors (Step S2, FIG. 4)

Figure 5:
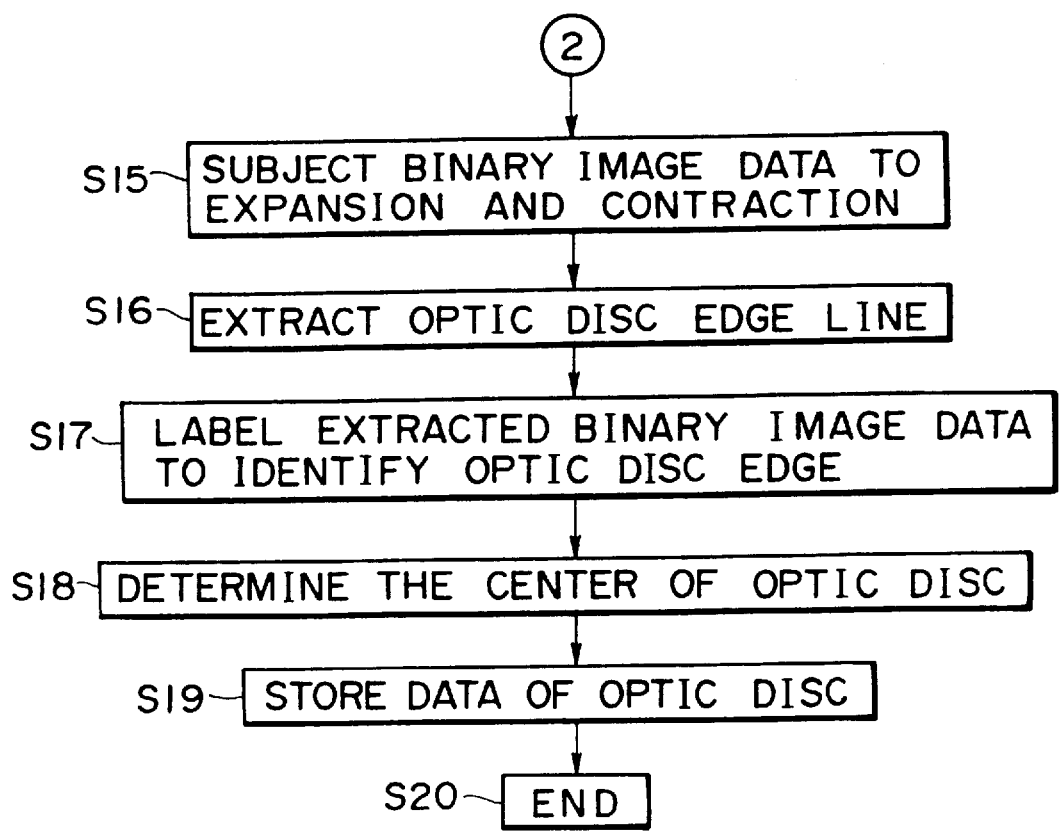
FIGS. 5(A), 5(B), and 5(C) constitute a flow chart of an optic disc detecting procedure utilizing color attributes to be carried out by the glaucoma analyzer of FIG. 1.

An optic disc detecting procedure using color attributes will be described in detail with reference to FIGS. 5(A), 5(B), and 5(C). The optic disc detecting procedure starts in Step S1. Retinal image data in an RGB space is transformed into that of HSI space to represent the optic disc image data by hue H, saturation S and intensity I. That is, the optic disc image data represented by three primary colors, i.e., red, green and blue, is subjected to HSI transformation to represent the same by hue H, saturation S and intensity I.

The HSI transformation can be achieved by various methods. Here, a method using a twin hexagonal pyramid model is used. This model is formed by putting two hexagonal pyramids together. One end of an intensity axis I, i.e., the center axis of the hexagonal pyramid, indicates black (I=0) and the other end of the intensity axis I indicates white (I=1). The intensity is defined by:

$$I = (\max\{R, G, B\} + \min\{R, G, B\})/2$$

The HSI transformation is expressed by:

$$I_{max} = \max\{R, G, B\}$$

$$I_{min} = \min\{R, G, B\}$$

The hue H and the saturation S are determined by using Imax, Imin, R, G and B.

In step S3, since a portion of the retinal image corresponding to an optic disc region is brighter than other portions, the retinal image data is searched for a point having a maximum intensity Imax. A point corresponding to the maximum intensity Imax is regarded as a high-intensity point. In step S4, a search range for labeling to extract a bright region is determined. A pixel having a lowest intensity, i.e., a low-intensity point, is selected among eight pixels surrounding the high-intensity point. A range between the high-intensity point and the low-intensity point is a labeling intensity range.

"Labeling" is an operation for grouping pixels adjacent to the high-intensity point and assigning a label (number) to the group of those pixels. When there are plural high-intensity points having the maximum intensity, the labeling operation is repeated a number times corresponding to the number of the high-intensity points.

In step S5, the pixels in the labeling range from the high-intensity point are labeled. A query is made in step S6 to see whether the labeling operation has been repeated eight times. If the response in step S6 is negative, the procedure returns to step S3. In step S3, the retinal image data other than those labeled in the preceding labeling cycles are searched for a high intensity point. If the response in step S6 is affirmative, the average saturation of each label is determined. The label having the highest average saturation is selected as that representing the optic disc in step S7, because the optic disc has a high intensity and a high saturation.

Figure 6:
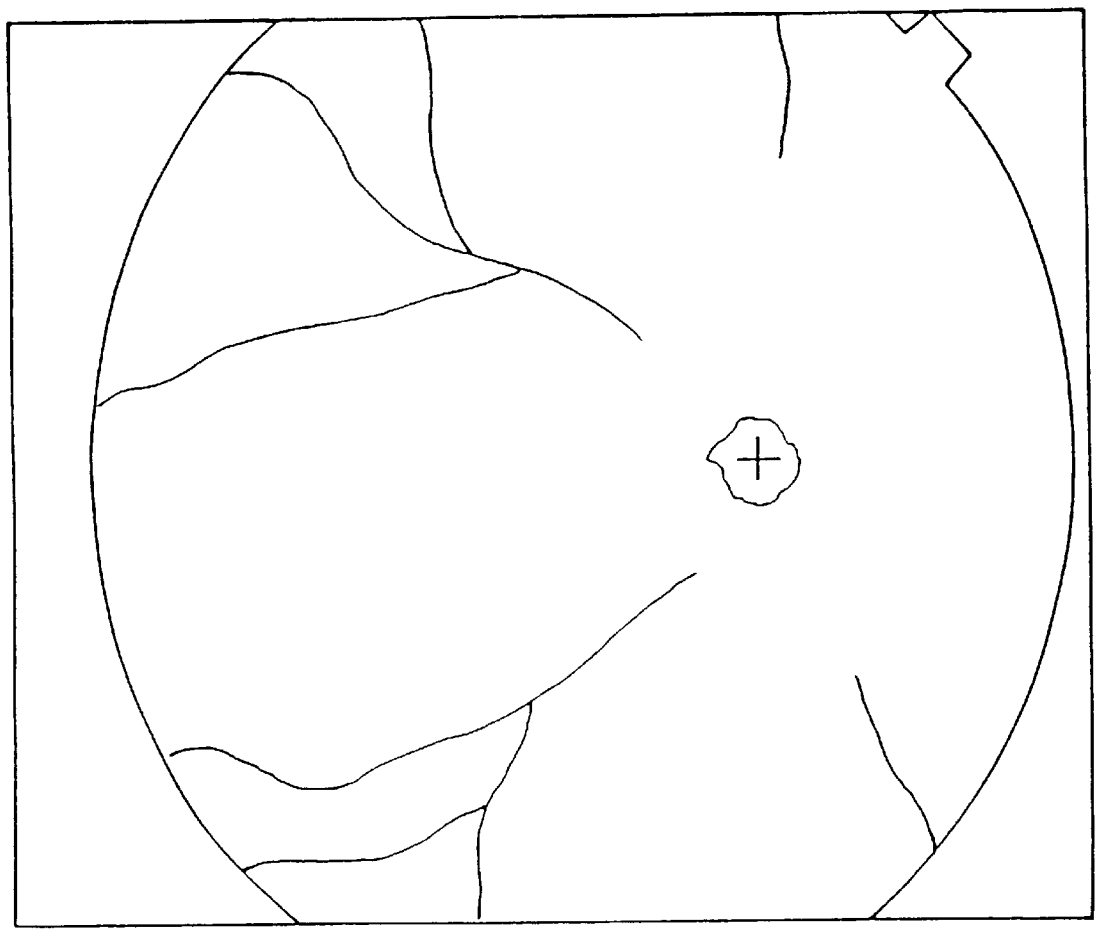
FIG. 6 is a pictorial view of the optic disc detected by the glaucoma analyzer of FIG. 1.

In step S8, the label having the highest intensity among the labels having the highest average saturation selected in step S7 is selected as a point in the optic disc as shown in FIG. 6.

Determination of the Optic Disc Edge

Figure 7:
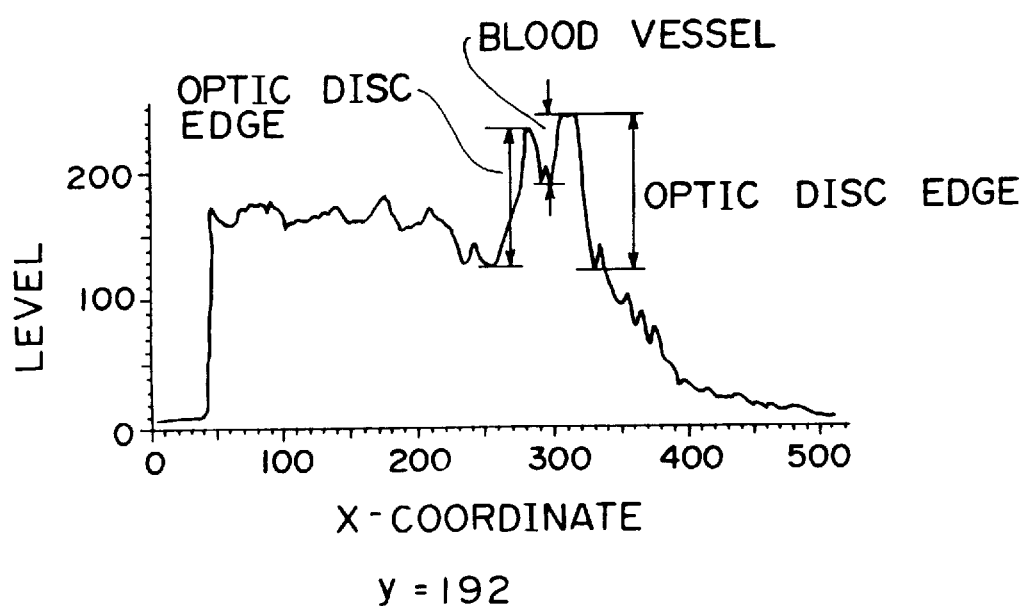
FIG. 7 is graph showing a profile produced by the glaucoma analyzer of FIG. 1.
Figure 8:
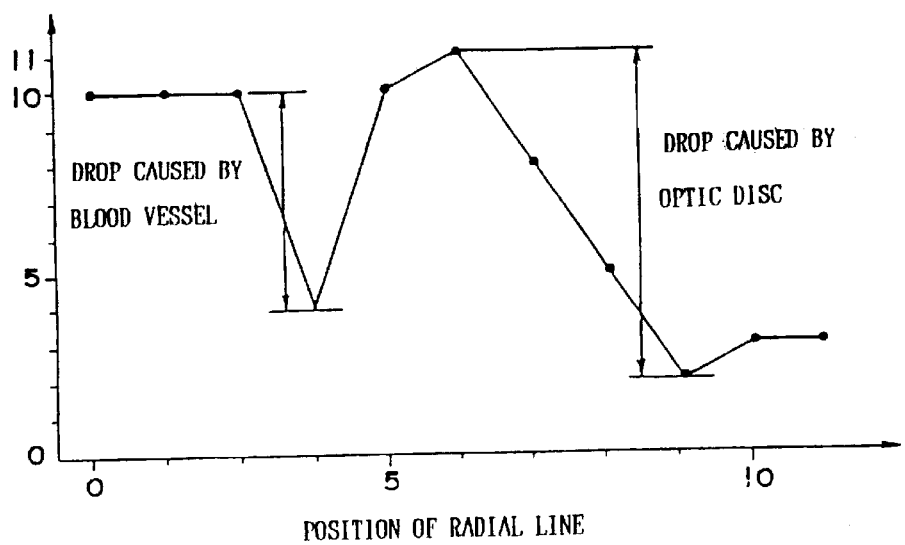
FIG. 8 is a graph which is helpful in describing a drop in a curve at a position corresponding to an optic disc edge.

First the approximate shape of the optic disc is extracted before determining the optic disc edge. In step S9, a 360° radial profile about the point in the optic disc selected in step S8 is obtained at an angular interval of 1°. The profile is a broken line representing the continuous variation of the image data. FIG. 7 shows the profile represented by the red, R-component among the red, green and blue components. FIG. 7 shows a drop caused by the optic disc which is greater than a drop caused by a blood vessel. Thus, the R-component will be used. FIG. 8 shows the drops.

In step S10, the position of a radial line corresponding to the start of the maximum drop and the position of a radial line corresponding to the end of the maximum drop are detected from the profile obtained in step S9. An optic disc edge detecting range is set in a range between those positions. In step S11, a point where the difference is a maximum is detected in the optic disc edge detecting range, and this point is considered an optic disc edge point. The optic disc edge points thus determined are connected to form an approximate shape of the optic disc edge.

The approximate shape of the optic disc edge determined in step S11 is used for precisely determining an optic disc edge. The R image is used because the reflection of the R-component of the optic disc is particularly high. If the R image is not satisfactory due to overexposure or the like, the G or B image may be used instead.

In step S12, the approximate shape of the optic disc edge is expanded to set a minute optic disc edge search region. The search region is limited by using information about automatic fundus coordinate system setting functions to exclude redundant information about other regions which will affect analysis adversely. This enhances the accuracy of histogram analysis.

Figure 9:
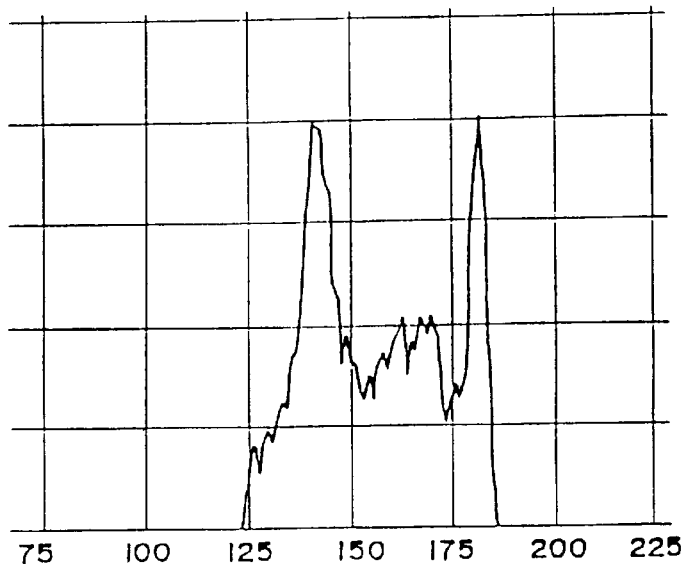
FIG. 9 is a histogram produced by the glaucoma analyzer of FIG. 1.

In step S13, histogram analysis is performed to determine a threshold for binarizing the image. In histogram analysis, the distribution of intensities of portions of the image is examined to find the numbers of pixels of the image in different intensity ranges. When an appropriate range is set, the intensity histogram of the image of the optic disc has three peaks as shown in FIG. 9, namely a peak corresponding to the outer side of the optic disc edge, a peak corresponding to the inner side of the optic disc edge and a peak corresponding to the pallor. Accordingly, the intensity corresponding to the bottom of a valley between the peak corresponding to the outer side of the optic disc edge and the peak corresponding to the inner side of the optic disc edge is used as a threshold for binarization.

In step S14, the image data is binarized by using the threshold determined in step S13 to eliminate noise that occurs in the outer side of the optic disc due to reflection by the retina and blood vessels. In this embodiment, noise is eliminated with reference to area. An area having two hundred or fewer pixels is considered noise. Other methods may be applied to eliminate noise.

In step S15, the binary image data produced in step S14 is twice subjected to expansion and contraction processes to fill small holes formed by blood vessels within the optic disc in the binary image of the optic disc region. The contraction process removes all the boundary points of given connecting components to reduce one layer. The expansion process increases one layer. Small components and small holes in the binary image are detected and removed by the combined effect of the expansion process and the contraction process.

In step S16, only the binary image data representing the edge of the optic disc is extracted from the binary image data. The extracted binary image data is labeled in step S17 to identify the optic disc edge.

In step S18, the center of the optic disc edge identified in step S17 is determined by using the centroid. The center may be the intersection of a maximum longitudinal diameter and a maximum transverse diameter of the optic disc edge.

The detailed shape and the coordinate data of the optic disc edge thus obtained are stored in step S19 and the procedure ends in step S20.

(ii) Optic Disc Detection Using Blood Vessel (Step S3, FIG. 4)

Figure 10:
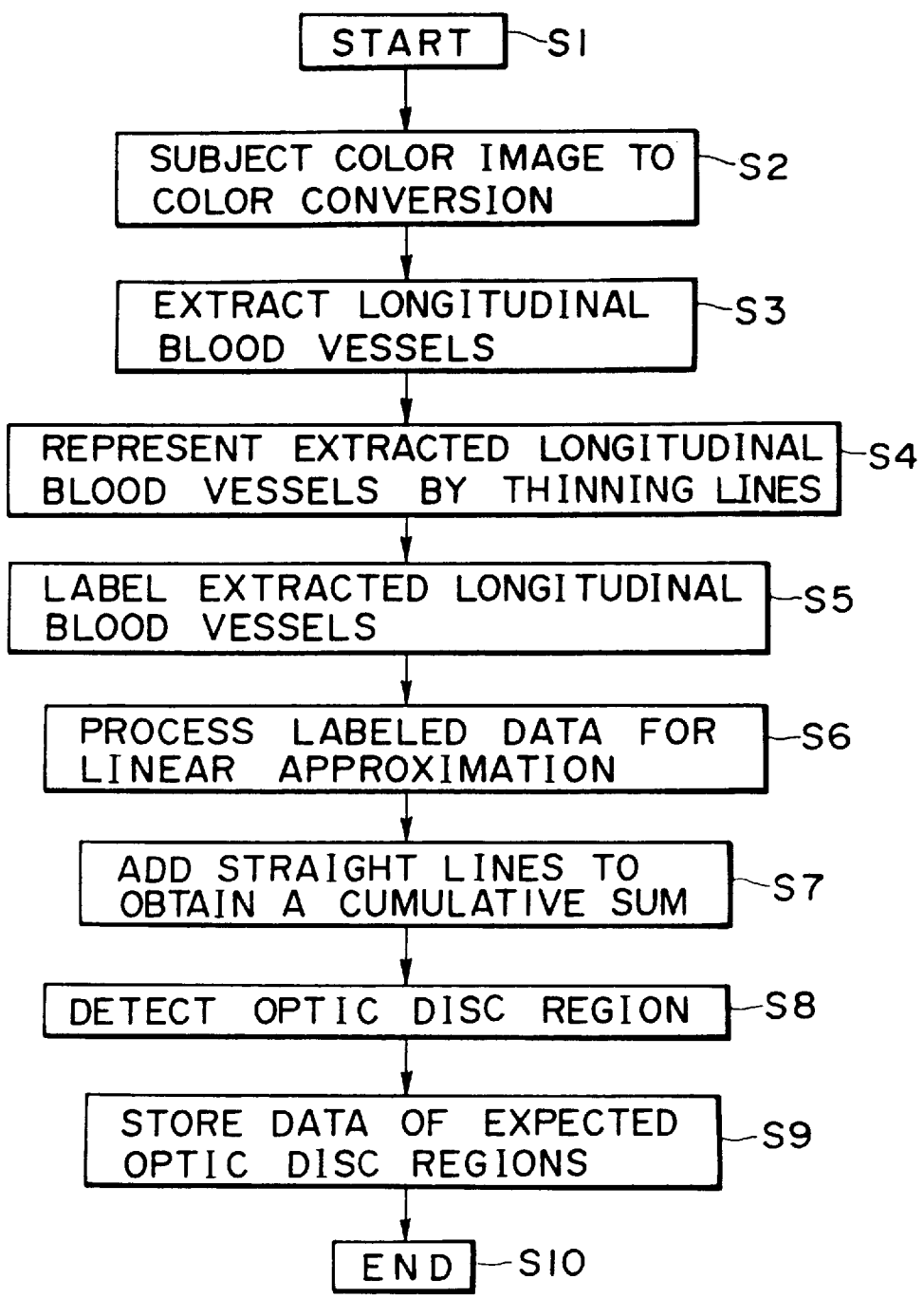
FIG. 10 is a flow chart of an optic disc detecting procedure using the data of blood vessels to be carried out by the glaucoma analyzer of FIG. 1.

An optic disc detecting procedure using blood vessels will be described with reference to FIG. 10. Blood vessels branch at the optic disc in directions substantially perpendicular to a transverse direction, i.e., a direction from the optic disc toward the macula lutea. The blood vessels branching perpendicularly at the optic disc are designated as longitudinal blood vessels, and the optic disc will be determined by using these blood vessels.

The optic disc detecting procedure starts in step S1. The RGB image is converted by color conversion into an image in which the level of an image of blood vessels is higher than that of an image of the retina. For example, images R/G, r, 255-g, R-G and r-g are obtained by color conversion. This embodiment employs the R/G image. The image R, 255-g, R-G or r-g may be employed, if necessary. Image data r, g and b are obtained by removing intensity from the RGB image data, and are defined by:

$r=R/(R+G+B)$ $g=G/(R+G+B)$ $b=B/(R+G+B)$

The longitudinal blood vessels are extracted in step S3 by an extraction method which will be described later.

Figure 11:
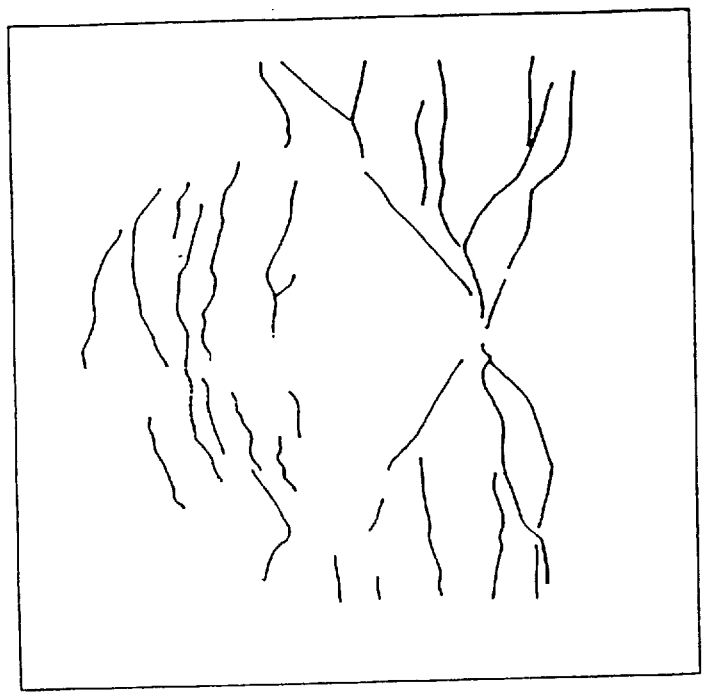
FIG. 11 is a pictorial view of blood vessels.

In step S4, the longitudinal blood vessels extracted in step S3 are represented by thin lines as shown in FIG. 11.

In step S5, the longitudinal blood vessels represented by thin lines are labeled, in which one label is assigned to a portion from an end point or an intersection to another end point or an intersection.

In step S6, the result obtained by labeling is processed by a least squares approximation method or the like for linear approximation. If each label includes an excessively large number of pixels, linear approximation is impossible, i.e., approximate straight lines depart from the corresponding blood vessels and do not pass the optic disc. Such a problem may be solved by using a least squares method of high order.

In this embodiment, the label is divided into twenty-pixel portions for linear approximation so that the approximate straight lines coincide with the blood vessel in small regions and the approximate straight lines will pass the optic disc. Labels having fewer than twenty pixels are not divided.

In step S7, the straight lines obtained by linear approximation in step S6 are expanded to form thick lines. The thick lines are added to obtain cumulative sums. In step S8, three higher positions where higher numbers of straight lines having maximum cumulative sums intersect are selected as expected optic disc regions. The expected optic disc regions are stored in step S9. The procedure terminates with step S10.

Longitudinal Blood Vessel Extracting Routine

Figure 12:
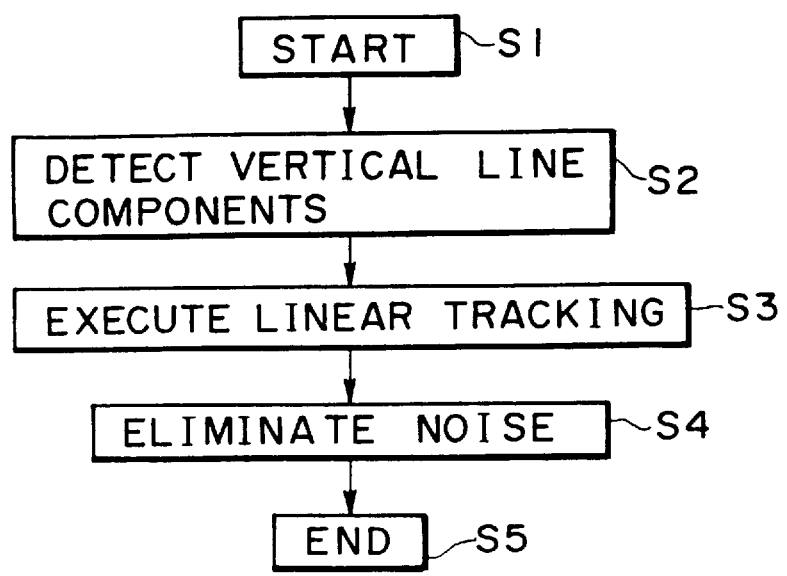
FIG. 12 is a flow chart of a longitudinal blood vessel extracting procedure to be carried out by the glaucoma analyzer of FIG. 1.

A longitudinal blood vessel extracting procedure will be described hereinafter with reference to FIG. 12. The procedure starts in step S1. Then, longitudinal line components are detected in step S2, in which only a longitudinal line filter is used and all the pixels longitudinally interacted with the line filter are extracted.

A linear tracking operation is performed in step S3. If the image is scanned entirely for line elements, linear tracking is carried out for a scanned region as object pixels. As shown in FIG. 13, if there is a line element in a tracking image direction from an object pixel, the line element is used as the next object pixel for linear tracking. If no line element is found by linear tracking, the linear tracking operation is interrupted. The number of pixels counted by linear tracking is stored. Then, scanning starts from a point from which the linear tracking of the image was started, and the linear tracking is terminated after the image has been entirely scanned.

In step S4, noise is eliminated. Since the image includes noise, the number Pi of pixels determined by the linear tracking operation in step S3 is compared with Pn expressed by:

$Pn=a/(20*(R/G)+1)$, where a=constant

The pixels are removed as noise if Pi is less than Pn. In this embodiment, "a" equals 4096.

(2) Detection of the Macula Lutea (Step S3, FIG. 3)

The macula lutea is a region having a radius equal to twice the diameter of the optic disc around the center of the central portion of the fundus. The macula lutea is made up of cones arranged in a close arrangement and constitutes a region of visual acuity and color sense. The region corresponding to the macula lutea is darker than the region surrounding the macula lutea. The macula lutea has an area of a certain size and a conical shape. These features are used for detecting the macula lutea.

A procedure for detecting the macula lutea will be described with reference to FIG. 14.

Figure 15:
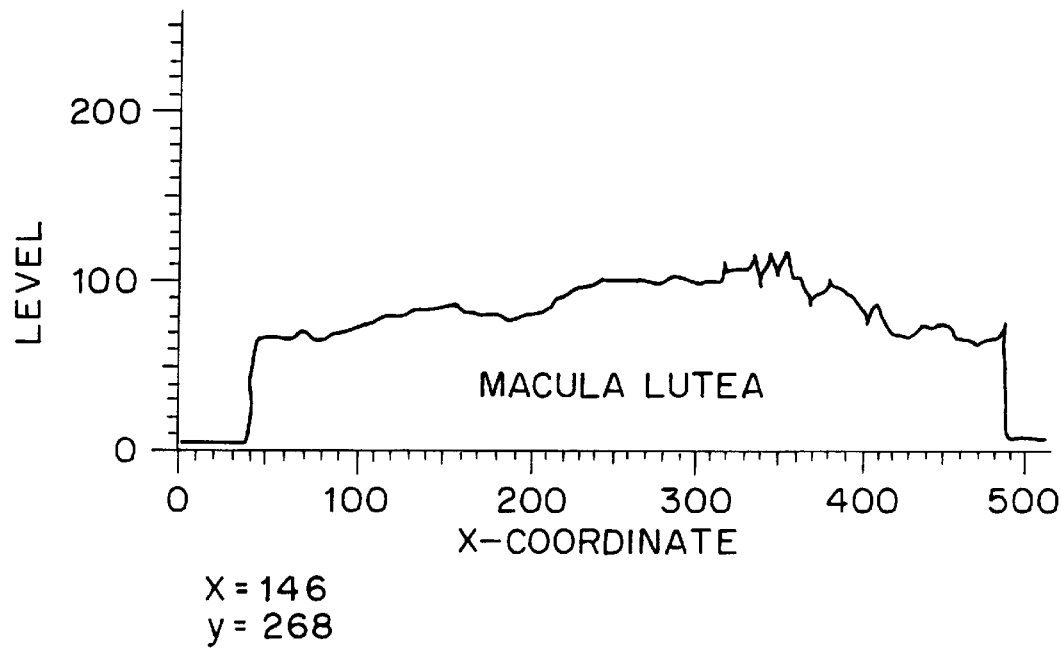
FIG. 15 is a graph of a profile for macula lutea detection by the glaucoma analyzer of FIG. 1.

A macula lutea detecting procedure starts in step S1. A 360° region about the center of the optic disc is divided at an angular interval of 1° in step S2 to produce profiles. As shown in FIG. 15, the range of the profiles corresponds to between 100 and 270 pixels. Since the macula lutea lies a distance of about twice the diameter of the optic disc (about 170 pixels on the image) toward the ear from the optic disc, a limited range of the retinal image data may be searched for the macula lutea. Thus, the retinal image data need not be entirely searched. If the magnification of the image is changed, the range is changed accordingly. If image data of both eyes are available, the range for macula lutea detection can be further reduced.

In step S3, the intensity gradient of each profile produced in step S2 is subjected to linear approximation to eliminate the influence of shading. Shading is the reduction of brightness in the peripheral region of an image. Shading correction corrects the density of an image so that the image has uniform brightness over its entire area. The differences of all the points in each profile are calculated and the mean of the differences is calculated. This mean is the inclination of a straight line. A least squares approximation may be used for the linear approximation of the intensity gradient instead of the method that uses the differences.

Figure 16:
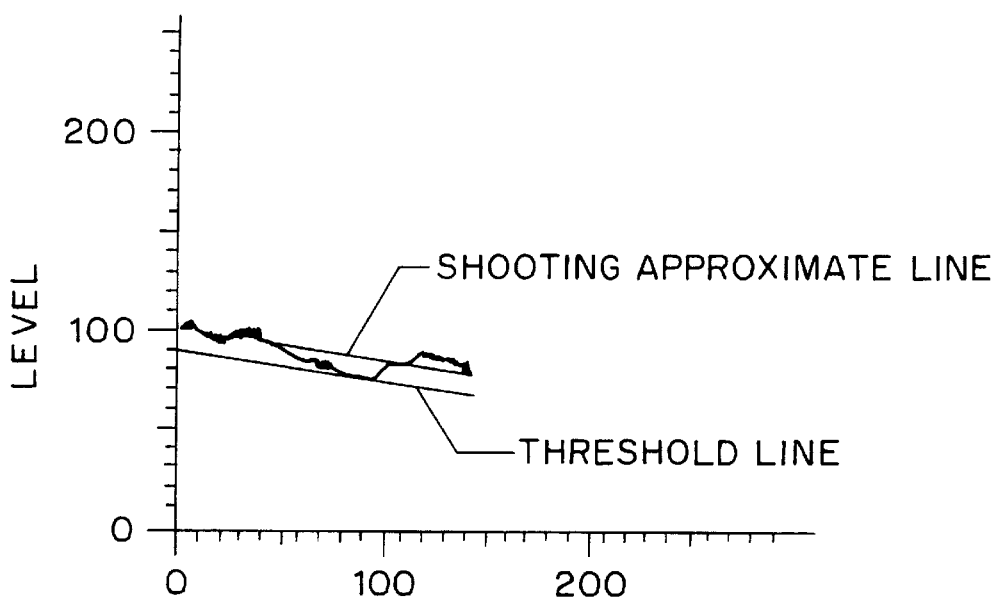
FIG. 16 is a graph which is helpful in describing a threshold line.

In step S4, a threshold line is determined for each of the profiles produced in step S2. The threshold line is determined on the basis of the shading approximation line and the standard deviation of the original data. A straight line obtained by vertically translating the shading approximation line by a distance equal to 2.5 times the standard deviation is a threshold line as shown in FIG. 16. The threshold line is used parallel to the gradient of intensity for comparison because it is difficult to achieve comparison by using a fixed threshold.

In step S5, comparison and region addition are performed. The image of the blood vessels darker than that of the retina must be removed to detect the macula lutea accurately. Therefore, the image of the macula lutea and that of the blood vessels must be separated from each other, taking into consideration that the macula lutea is round and has an area, and that the blood vessels are elongated by comparison. When comparing the threshold line and the pixels on the threshold line, the mean intensity of an 11 by 11 region around the object pixel is compared with the threshold line. If the mean intensity is lower than the threshold line, "1" is added to the 11 by 11 region around the object pixel. This procedure is carried out for all the profiles produced in step S2.

Figure 17:
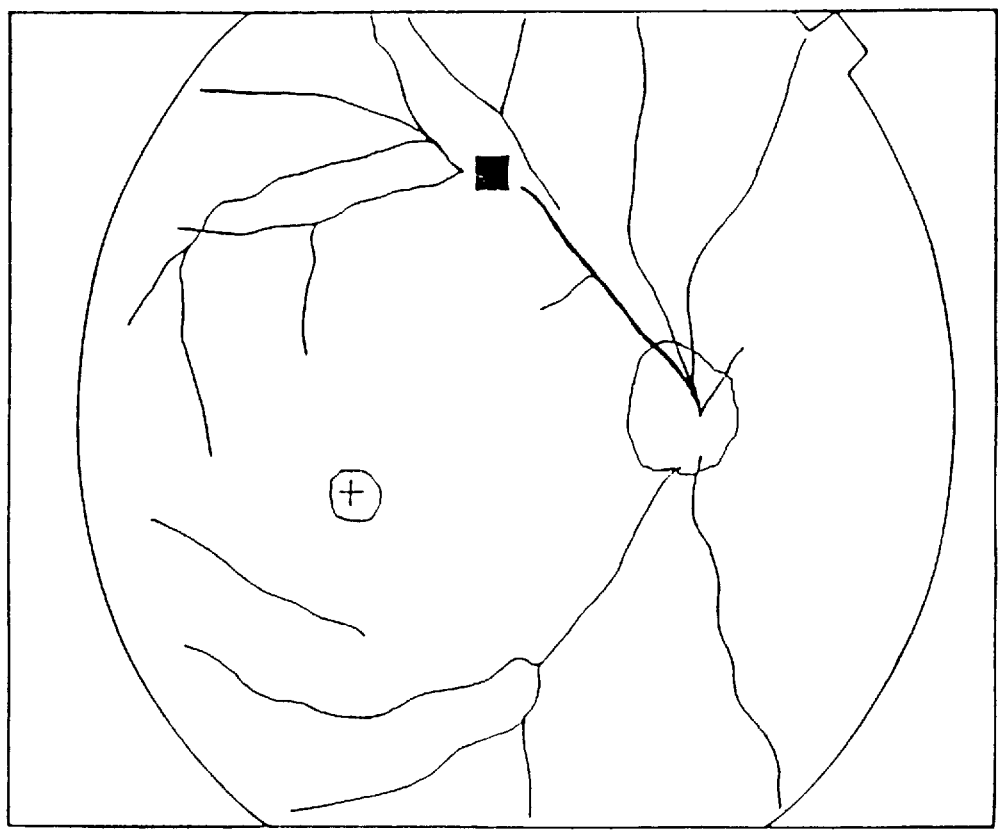
FIG. 17 is a pictorial view which is helpful in describing the center of the macula lutea detected by the glaucoma analyzer of FIG. 1.

In step S6, a point having a maximum value obtained by cumulative addition performed in step S5 is selected as the center of the macula lutea as shown in FIG. 17. The use of the point having the maximum value prevents the erroneous detection of a small region, such as the intersection of blood vessels. The coordinates of the center of the macula lutea are determined in step S7 and the procedure ends in step S8.

(3) Coordinate Axes Determination (Retinal Coordinate System Setting) (Step S4, FIG. 3)

Figure 18:
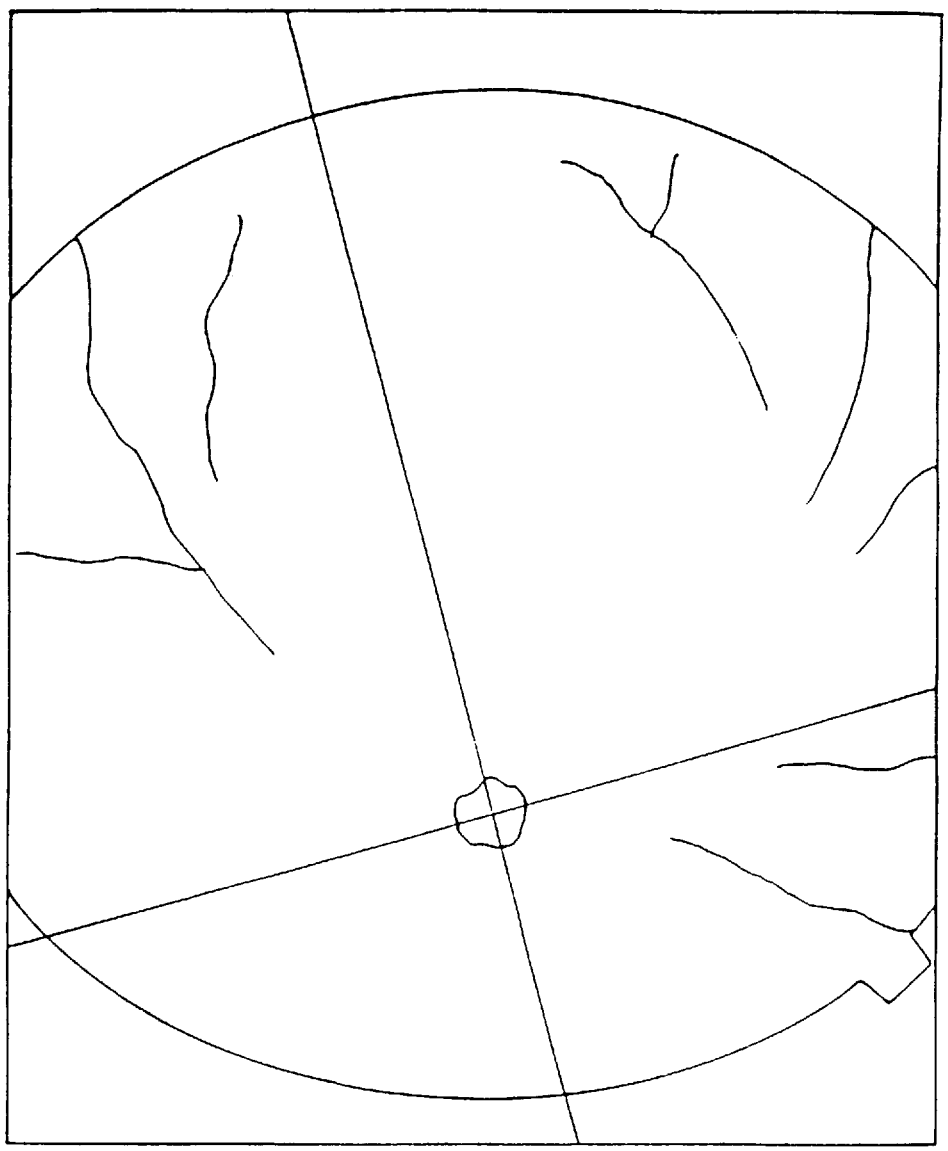
FIG. 18 is a pictorial view which is helpful in describing a fundus coordinate system set by the glaucoma analyzer of FIG. 1.

Coordinate axes are determined on the basis of the results of detection of the optic disc and the macula lutea. In an orthogonal coordinate system shown in FIG. 18, the abscissa axis passes the center of the optic disc and the macula lutea, and the ordinate axis is perpendicular to the abscissa axis and passes through the center of the optic disc. In this orthogonal coordinate system, the distance between the macula lutea and the optic disc is a unit distance. In most cases, the axes of the orthogonal coordinate system are inclined relative to the image. The procedure includes image data transformation to make the orthogonal coordinate system coincide with the image.

A curvilinear coordinate system established by combining these coordinate axes and a nerve fiber bundle distribution pattern, which will be described later, corresponds to a fundus coordinate system.

Based on the center of the optic disc, coordinate axes are set such that the abscissa having reverse direction to the macula lutea is located at 0°, the upper part of the ordinate is located at 90°, the macula lutea side abscissa is located at 180°, and the lower part of the ordinate is located at 270°.

In the present specification, the angle of this coordinate axis is called the optic disc inner angle.

B. Automatic Pallor Analyzing Procedure

When the eye suffers from glaucoma, the nerve fiber bundles suffer a defect and the optic disc cupping expands.

Although the pallor is not the optic disc proper, the condition of the pallor is closely related with glaucoma and is an important clinical factor connected with glaucoma. Since the pallor lies on the optic disc, the image of the pallor can be extracted by the same principle as that on which the automatic fundus coordinate system setting procedure extracts the image of the optic disc edge. This embodiment uses the G (green) image which is difficult to be saturated in the bright optic disc used to detect the pallor. An image of B (blue) intensity or saturation transformed for the HSI space may be used instead of the G (green) image.

An automatic pallor analyzing procedure will be described hereinafter with reference to FIGS. 19(A) and 19(B).

The automatic pallor analyzing procedure starts in step S1. The G image is extracted from the retinal image in step S2. Then, the coordinates of the center of the optic disc on the fundus coordinate system are read in step S3 and the coordinates of the optic disc edge on fundus coordinate system are read in step S4. The optic disc edge is set as a pallor search region, and a threshold is determined through histogram analysis in step S5. When the pallor search region is set properly, the histogram of the pallor region has a peak corresponding to a portion of the optic disc edge on the nasal side, a peak corresponding to a region in the vicinity of the optic disc edge, and a peak corresponding to the pallor. The density of a portion corresponding to the bottom of a valley between the peak corresponding to the pallor and the peak corresponding to the region in the vicinity of the optic disc edge is used as a threshold for binarization.

In step S6, the G image is binarized by using the threshold determined in step S5. In step S7, noise caused by reflection by the blood vessels is eliminated with reference to area. In this embodiment, a small binarized area having two hundred or fewer pixels is considered noise. The condition specifying noise may be changed.

A query is made in step S8 to see whether there are holes in the binarized image attributable to the blood vessels within the pallor which must be filled. If the response in step S8 is affirmative, an expansion-contraction process is carried out in step S9 to cause the holes in the binarized image to disappear. After the completion of the expansion-contraction process in step S9, only the edge of the binarized region is extracted in step S10. If it is decided in step 8, under the assumption that the pallor does not include any blood vessels, that holes need not be filled, the procedure goes directly to step S10.

After the edge of the binarized region is extracted in step S10, labeling is commenced in step S11 and the edge of pallor is identified. As a result, the data of the center of the optic disc, the edge of the optic disc and the edge of the pallor are obtained.

In step S12, DD(θ) (the distance between the center and the edge of the optic disc) and DP(θ) (the distance between the center of the optic disc and the edge of the pallor) are calculated for each optic disc inner angle.

In step S13, on the basis of the medical fact that the expansion of the pallor is related to the optic disc recess, i.e., defects in the nerve fiber bundles, the change of the shape of the pallor relative to the optic disc is calculated. Values representing the change in the shape of the pallor relative to the optic disc, such as DD(θ)–DP(θ) and DP(θ)/DD(θ), are calculated for each optic disc inner angle θ on the basis of DD(θ) and DP(θ).

In step S14, the numbers of pixels in the pallor and the optic disc are counted to determine the area of the pallor and that of the optic disc. The ratio of the area of the pallor to that of the optic disc is calculated. In step S15, the calculated values, i.e., DD(θ)−DP(θ), DP(θ)/DD(θ), DD(θ), DP(θ) for each optic disc inner angle θ, the ratio of the area of the pallor to that of the optic disc, and glaucoma indices indicative of the condition of glaucoma, are provided to analyze the condition of glaucoma.

In step S16, the data including DD(θ)−DP(θ), DP(θ)/DD(θ), DD(θ) and DP(θ) is stored and the procedure ends in step S17.

Figure 20:
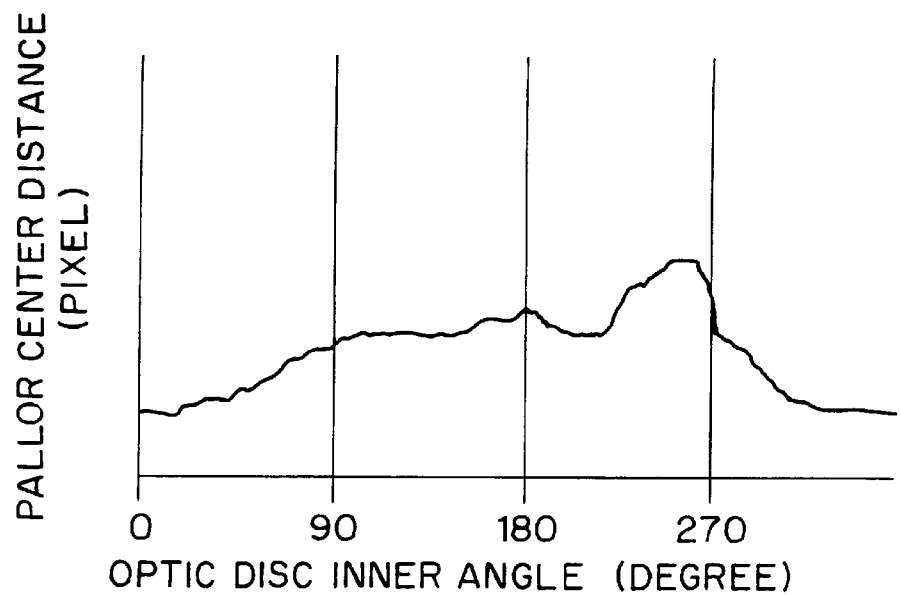
FIG. 20 is a graph which is helpful in describing the results of automatic pallor analysis carried out by the glaucoma analyzer of FIG. 1.

This embodiment is capable of automatically extracting the images of the optic disc edge and the pallor edge as shown in FIG. 20 and of providing the glaucoma indices for the optic disc inner angles θ and the ratio of the area of the pallor to that of the optic disc.

C. Automatic Blood Vessel Curvature Analyzing Procedure

Glaucoma causes the exfoliation of the nerve fiber layer, entailing the expansion of the recess of the optic disc on which the nerve fiber layer converges. It is known that, in most cases, a portion of the optic disc blood vessel extending in the vicinity of the optic disc edge is bent severely as the recess of the optic disc expands.

A portion of the retinal image corresponding to the blood vessel has a large r-component and a small g-component. Therefore, an r-g-component of 256 gradations is used in this embodiment. The components r, g and b are those obtained by removing intensity data from the RGB image data and are defined as in Section (1)(ii) above. Thus, the r-component and the g-component represent the fractional values of the red component and the green component in the chromaticity coordinates, and r+g+b=1.

The analysis of blood vessel curvature on the optic disc edge to be carried out by the embodiment will be described with reference to FIGS. 21(A) and 21(B).

A blood vessel curvature analyzing procedure starts in step S1. Then, the coordinates of the optic disc determined by the automatic fundus coordinate system setting procedure are read in step S2. The coordinates of the optic disc edge determined by the automatic fundus coordinate system setting procedure are read in step S3. Blood vessels are extracted and a group of connected pixels with respect to four directions, i.e., upward, downward, rightward and leftward directions, is labeled. A method of extracting the blood vessels will be described later.

In step S5, peaks of profiles in an r-g image at the intersection of the labels of the blood vessels extracted in step S4 and the optic disc edge are extracted. Labels 1 to $N_{vd}$ are attached to the peaks. $N_{vd}$ is the number of the extracted blood vessels an the optic disc edge. The labeled blood vessels intersecting the optic disc edge are designated as optic disc edge blood vessels.

Figure 22:
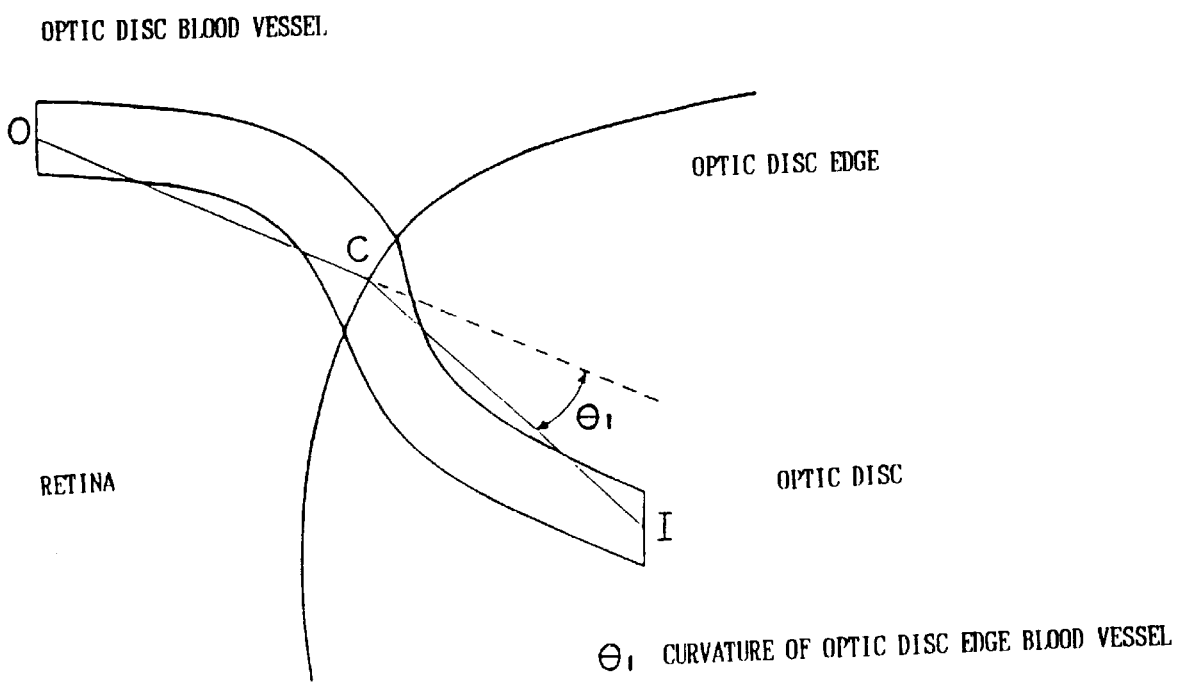
FIG. 22 is a diagrammatic view which is helpful in describing the curvature of a blood vessel around the optic disc.

In step S6, the coordinates of each pixel extracted in step S5 are used as the coordinates of the midpoint C of an edge blood vessel on the optic disc shown in FIG. 22. In steps S7 and S8, the pixels of each blood vessel are tracked outward and inward through a fixed distance from the center of the optic disc for the labels 1 to $N_{vd}$ of the optic disc edge blood vessels to determine an inner point I and an outer point O. In this embodiment, the blood vessel is traced along the peaks in the r-g image through distances corresponding to ±5 pixels from the midpoint C. If blood vessel tracing within this range is unsuccessful, it is considered from clinical knowledge that the optic disc edge blood vessel extends on the back side of the retina due to excessive expansion of the recess, which is pertinent information for the diagnosis of glaucoma as well as for the curvature of the optic disc edge blood vessel.

In step S9, the inclinations of a straight line I-C connecting the midpoint C and the point I, and a straight line O-C connecting the midpoint C and the point O, on the coordinate system for all the labels 1 to $N_{vd}$ of the optic disc edge blood vessels are calculated. A blood vessel curvature VC(θ) with respect to the direction of the optic disc inner angle θ, i.e., the intersection angle between the straight lines I-C and O-C, is detected for each of the labels 1 to $N_{vd}$ of the optic disc edge blood vessels in step S10. The blood vessel curvature VC(θ) is a curvature with respect to a direction of the midpoint C.

The blood vessel curvatures VC(θ) determined in step S10 are stored in step S11 as data for the comprehensive analysis of glaucoma, and then the procedure ends in step S12.

In step S10, the blood vessel curvatures VC(θ) for the optic disc inner angles θ and the mean of the blood vessel curvatures VC(θ) may be calculated and displayed to utilize the detected data individually. Although the blood vessel curvatures are determined with reference to the optic disc edge in this embodiment, the blood vessel curvatures may be determined with reference to the pallor edge.

D. Automatic Nerve Fiber Bundle Defect Analyzing Procedure

The reflectance of the nerve fiber layer decreases with progressive exfoliation due to glaucoma or the like, and the tone of the image of the nerve fiber layer darkens. Although specialists in glaucoma analysis are capable of identifying very delicate glaucomatous changes in the nerve fiber layer, such changes are generally difficult to detect. As exfoliation of the nerve fiber layer propagates along the fiber bundles, such exfoliation is called optic nerve fiber bundle defect.

The automatic nerve fiber bundle defect analyzing procedure will be described with reference to FIGS. 23(a)(A) and 23(a)(B).

Figure 24:
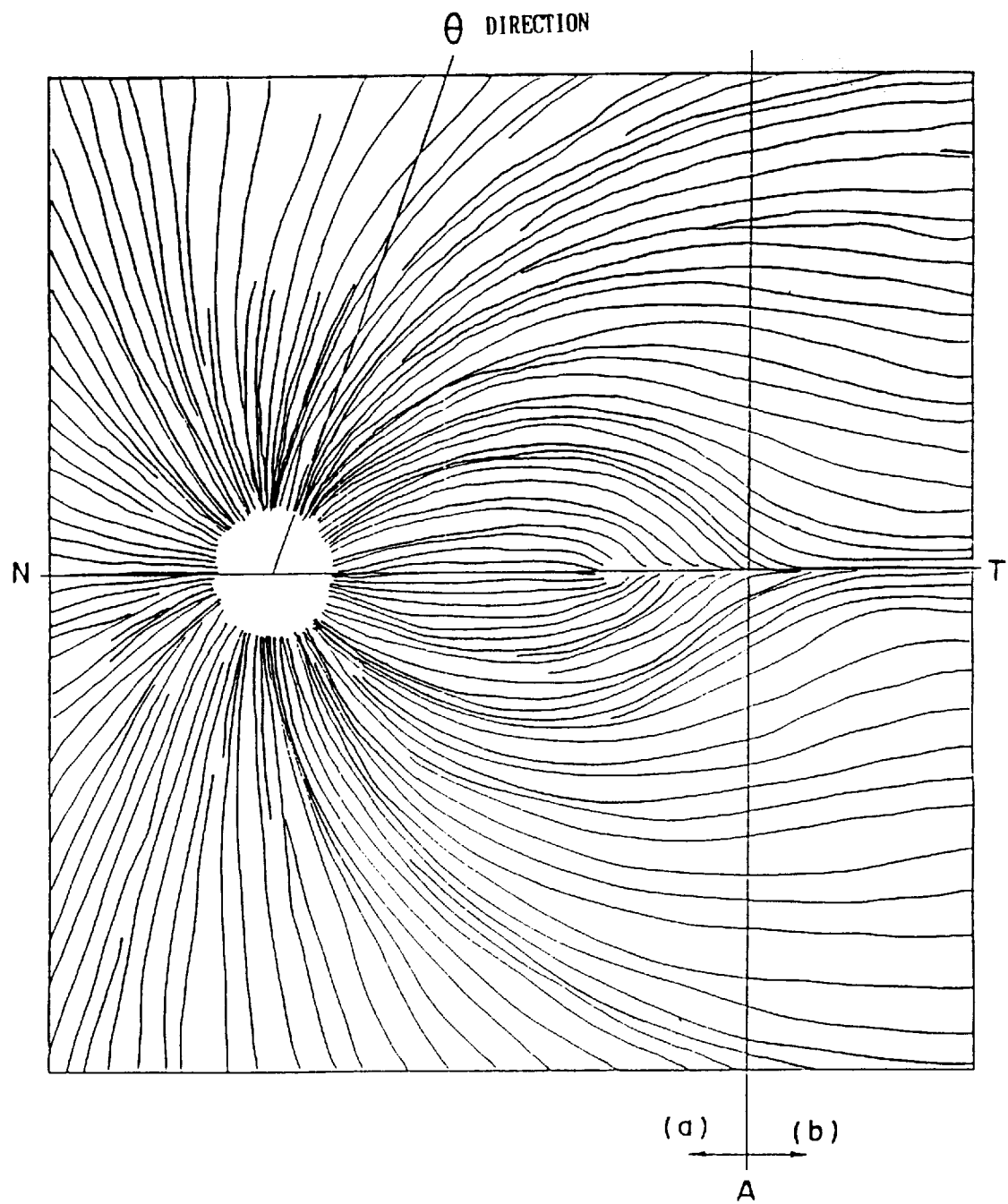
FIG. 24 is a pictorial view of an optic nerve arrangement determined through simulation by the glaucoma analyzer of FIG. 1.

The automatic nerve fiber bundle defect analyzing procedure starts in step S1. The coordinates of the center of the optic disc determined by the automatic fundus coordinate system setting procedure are read in step S2. The coordinates of the center of the macula lutea determined by the automatic fundus coordinate system setting procedure are read, and a coordinate system is set with the abscissa axis in alignment with the line between the optic disc and the macula lutea and with the ordinate axis perpendicularly intersecting the abscissa axis at the center of the optic disc. The distance between the optic disc and the macula lutea is the reference length on the coordinate axes. The coordinate axes are connected with an optic nerve distribution pattern as shown in FIG. 24, provided by Hogan to set a curvilinear coordinate system conforming to an optic nerve distribution pattern corresponding to the image data of the subject's retina. The subject's optic nerve fiber distribution pattern is formed by correcting the scale and the inclination of the general optic nerve fiber distribution pattern as shown in FIG. 24 with reference to the respective positions of the macula lutea and the optic disc included in the subject's retinal image data. This step corresponds to the automatic fundus coordinate system setting procedure and the step of fundus coordinate system setting, and to the optic nerve fiber distribution pattern forming step.

While the conventional method searches the retinal image along radial lines radiating from the center of the optic disc, this embodiment is capable of directly searching the arrangement of the optic nerve fibers and of detecting defects in the nerve fiber bundles with a high sensitivity and without being disturbed by noise. Furthermore, this embodiment is capable of introducing, into image processing, medical information including the probability of occurrence of glaucomatous scotomas in the visual field. The information about the nerve fiber layer can be contrasted with information about the optic disc by projecting the information about the nerve fiber layer on the information about the optic disc inner angle θ. Accordingly, a comprehensive glaucoma analyzing system can be built.

In step S4, the data representing the shape of the optic disc edge produced by the automatic fundus coordinate system setting procedure is read, and the inside of the optic disc edge is labeled as the optic disc. In step S5, the data of the blood vessels is extracted from the image data, and the data is labeled as blood vessel image data. In the chromaticity coordinates of the blood vessel image, the r-component is large and the g-component is small. Therefore, the input image signals are converted into an image having 256 gradations of the r-g-component, and the image of the blood vessels is extracted from the converted image. The difference between the density of the image of the retina and that of the image of the blood vessels is equal to about twenty gradations.

Figure 23B:
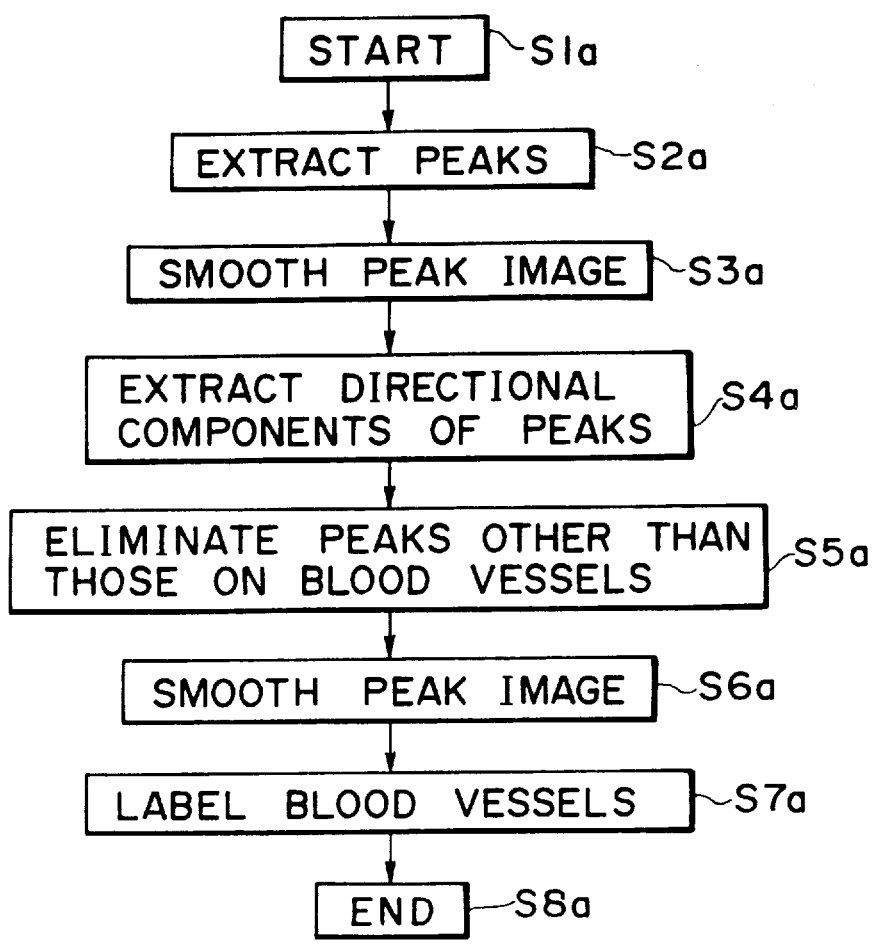
FIGS. 23($a$)(A) and 23($a$) (B) constitute a flow chart of an automatic nerve fiber bundle defect analyzing procedure to be carried out by the glaucoma analyzer of FIG. 1.

A blood vessel extracting procedure will be described in detail with reference to FIG. 23(b). In this embodiment, the linear components are regarded as those of the blood vessels. That is, groups of pixels forming bright lines on the dark background are considered to be images of the blood vessels.

The blood vessel extracting procedure starts in step S1a. A bridge filter is applied to all the pixels to extract peaks. The bridge filter employed herein is an extension of a common bridge filter (operation in two directions) as shown in data e3. The bridge filter scans along a plurality of directions to extract peaks regardless of the shape of the blood vessel, and has a threshold and an improved accuracy. In this embodiment, the bridge filter scans along ten directions on a circle having a diameter corresponding to seven pixels (L=3) and its center on an object pixel. The threshold is fifteen. If a scanning direction among the ten scanning directions meets an inequality: 2*f−(a+b)>15, the pixel is extracted as a peak.

In step S3a, an expansion and contraction operation is performed to fill minute holes in the image of the peaks to smooth the image of the peaks. The directional components of all the peaks is extracted in step S4a. The distribution of peaks is searched along twenty directions in a region having its center on the object peak and a diameter corresponding to twenty pixels, including a component along a direction at an angle of 90° to a direction in which the least number of peaks are distributed.

In step S5a, peak distribution along a direction perpendicular to the directional component extracted in step S4a is searched for all the peaks to see if each peak is a blood vessel. Since the peak located at the center of the peak distribution indicates the width of the section of a blood vessel portion, the peaks that do not conform to the expected width of blood vessels are excluded. In this embodiment, peaks having a fixed angle of view and a maximum width greater than twelve pixels are excluded.

In step S6a, an expansion and contraction operation is performed again to fill minute holes in the peak image to smooth the peak image. In step S7a, the peak image smoothed in step S6a is taken as a blood vessel image and the blood vessel image is labeled as a blood vessel portion. The blood vessel extracting procedure ends in step S8a. Thus, blood vessels are extracted.

Nerve fiber bundle defect analysis will be described with reference to FIGS. 23(a)(A) and 23(a)(B). As the blood vessels are extracted from the image data and are labeled as a blood vessel portion in step S5, the periphery of the labeled blood vessel is labeled as a blood vessel periphery in step S6. In this embodiment, the periphery of the labeled blood vessel is within a distance corresponding to five pixels.

In step S7, pixels that will adversely affect the analysis are excluded. In this embodiment, the optic disc portion, the blood vessel portion and the periphery of the blood vessels extracted in steps S4, S5 and S6 are excluded to use a retina portion for the following analysis. In step S8, the input image is converted into a B+G image having sixty-four gradations. The B+G image corresponds to a common red-free projection photograph. Defects in the nerve fiber bundles are set off by contrast and the influence of the choroid blood vessels is insignificant in the B+G Image.

Figure 25:
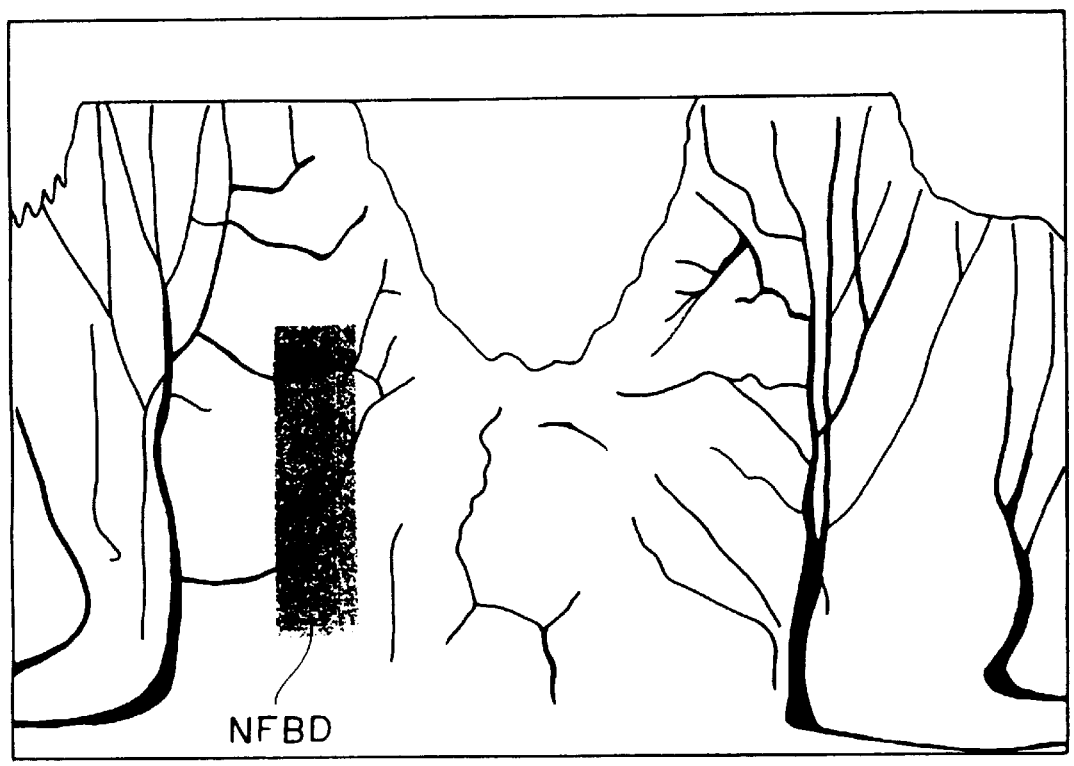
FIG. 25 is a pictorial view of an original picture, in which an optic disc inner angle is measured on the ordinate axis and distance along nerve fiber bundles is measured on the abscissa axis.

In step S9, the nerve fiber bundles are simulated on the image coordinate system and the image is scanned for image density along a scanning line to determine the average image density of each nerve fiber bundle. FIG. 25 shows an image obtained by converting an original image so that the optic disc inner angle is indicated on the abscissa axis, and the distance measured along the nerve fiber bundles is indicated on the ordinate axis. A defect in the optic nerve fiber bundle, converted in a rectangular shape lies in the left-hand quarter portion of FIG. 25.

The nerve fiber bundles will be simulated on the basis of a Hogan's optic nerve fiber diagram. In simulating the nerve fiber bundles, the coordinates of the input image are combined with the optic disc inner angles θ.

As shown in FIG. 24, a position A is a singular point where the nerve fiber bundles warp. Although portions of the nerve fiber bundles in a region between the macula lutea and the position A can be approximated by using comparatively simple equations of motion, somewhat complex equations must be used to approximate the nerve fiber bundles entirely. A retinal photograph taken in a common angle of view and composition includes only a region between the macula lutea and the position A. Therefore, one or the other of the following two nerve fiber bundle simulating methods will be used as required:

(1) A first nerve fiber bundle simulating method approximates the nerve fiber bundles by equations of motion as a function of optic disc inner angle θ. Since the arrangement of the nerve fiber bundles is similar to the trajectory of a ball rolled on the surface of a conical depression, this trajectory can be expressed by an equation of motion as a function of the optic disc inner angle θ.

(2) A second optic nerve fiber bundle simulating method approximates a function for each optic disc inner angle θ by a least squares method. This second nerve fiber bundle simulating method is able to approximate portions of the nerve fiber bundles beyond the position A accurately.

First, the first nerve fiber bundle simulating method will be described.

The trajectory of a ball rolled on the frictional surface of a conical depression from the center of the optic disc at an angle θ at an initial velocity $V_0$ corresponding to the nerve fiber bundles is expressed by:

$$F = ma = mg/r^2 - \mu m V$$

When the optic disc is a circle having a certain area, the following approximation is possible. The trajectory of a ball rolled from the optic disc toward the macula lutea on the frictional surface of a conical depression generating an acceleration $G/R^3$ and having friction inversely proportional to the square of the distance r from the hollow at an angle $\theta$ at an initial velocity $V_0$ corresponds to the nerve fiber bundles and is determined on the basis of the following equation of motion:

$$ma=mg/r^3-\mu'mv/r^2$$

where m is the mass of the ball, $\mu'$ is the coefficient of friction, g is the gravitational acceleration, r is the distance from the hollow, and V is velocity.

Figure 26:
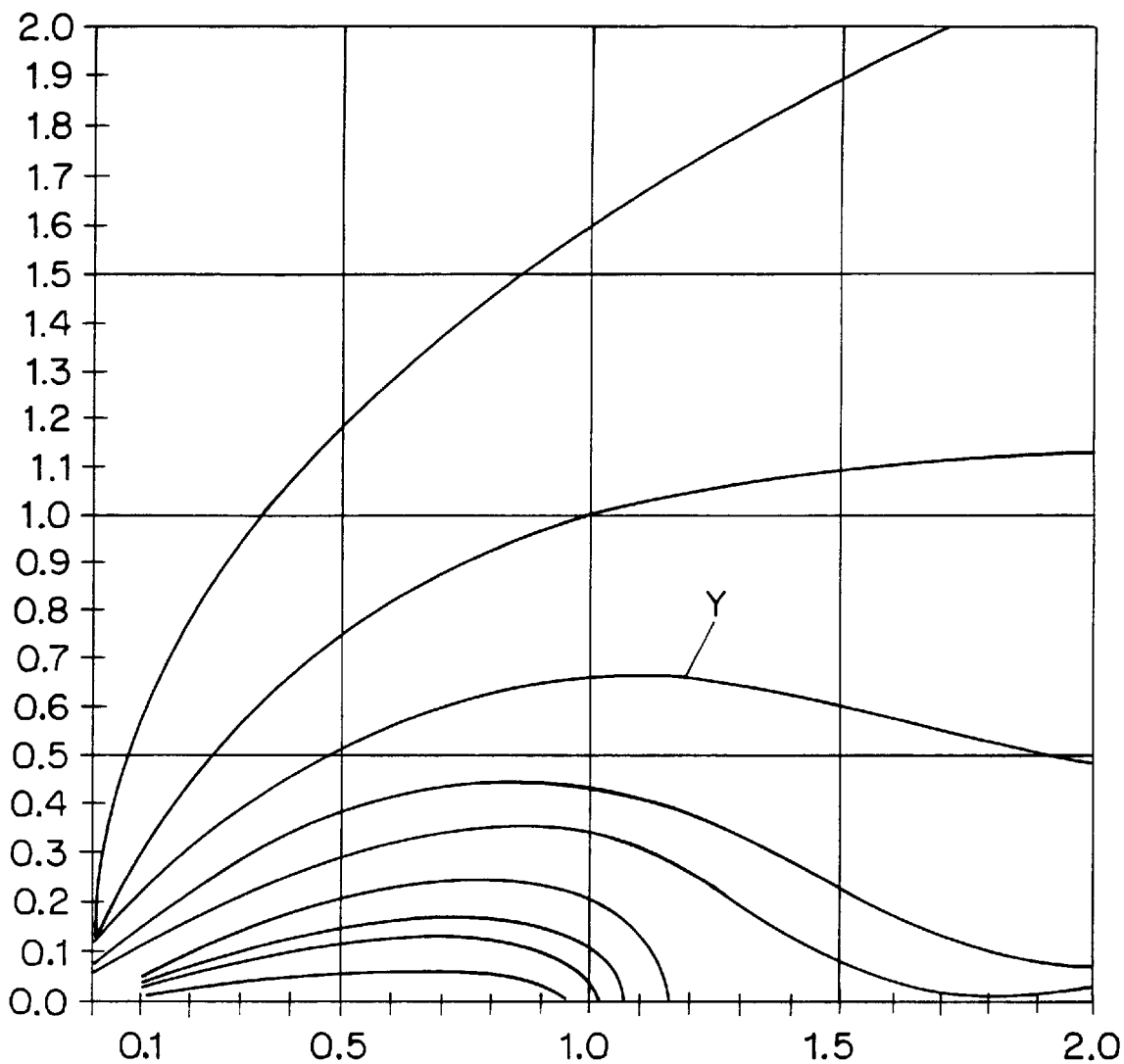
FIG. 26 is a graph which is helpful in describing an optic nerve fiber arrangement determined through simulation by the glaucoma analyzer of FIG. 1.

A second nerve fiber bundle simulating method reads the data of nerve fiber bundles for necessary optic disc inner angle $\theta$ from Hogan's optic nerve fiber diagram, applies the data to an eighth order equation and, as shown in FIG. 26, determines the coefficients of functions for the optic disc inner angles $\theta$ by a least squares method. The aforesaid equation by nature is capable of expressing the image entirely. However, even if the image has a good image quality, the reliability of information about the density of the peripheral portion of the image is impaired by irregular illumination. The retina is colored in a color distribution, and brightness changes from position to position on the image of the retina. For example, a portion around the macula lutea is dark and a portion along the arcade is bright. Therefore, when using the aforesaid equation for approximating a large region of the retinal image, the distribution of intensity of illuminating light and the distribution of colors on the retina are measured beforehand and the image must be corrected. In this embodiment, the aforesaid equation is applied to approximating a region 0.4 times the distance between the center of the optic disc and the fovea centralis.

In step S9, the average image density of the image of each nerve fiber bundle is determined. A graph showing the relation between the optic disc inner angle $\theta$ and the average image density is produced in step S10. In some cases, there is no image at all on the path for some optic disc inner angle $\theta$. In such a case, the average image density for the optic disc inner angle $\theta$ is determined by linear interpolation using the average image densities of the opposite ends.

Figure 27:
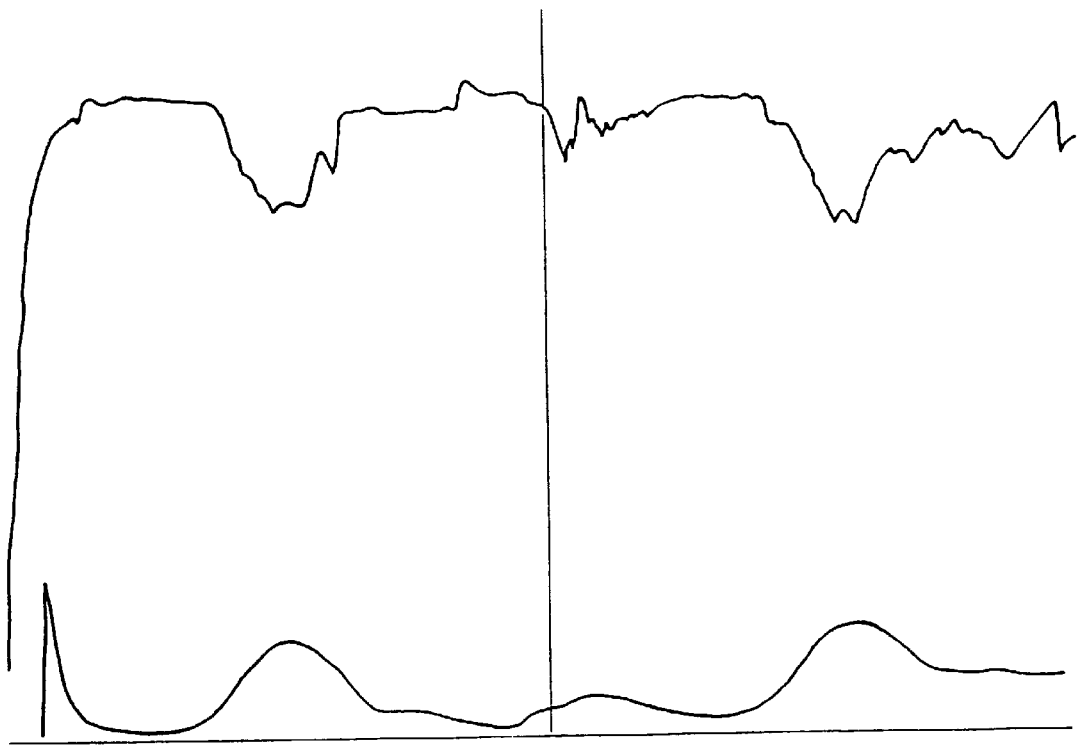
FIG. 27 is a graph showing the relation between an optic disc inner angle $\theta$ and a nerve fiber bundle defect index NFBD($\theta$).

In step S11, the relation between the optic disc inner angle $\theta$ and the average image density determined in step S9 is transformed into the relation between the optic disc inner angles $\theta$ and nerve fiber bundle defect indices NFBD($\theta$) as represented by a graph shown in FIG. 27. This transformation uses the positional probability of occurrence of defects in the nerve fiber bundles determined by Aulhorn et al. for limiting a search region and as a weight factor.

More specifically, the graph showing the relation between the optic disc inner angle $\theta$ and the average image density is inverted. The inverted graph is smoothed by an averaging filter of a width corresponding to a forty-unit angle $\theta$. Regions corresponding to a section between the directions of five o'clock and eight o'clock and a section between the directions of ten o'clock and eleven o'clock are selected as graphs representing the relation between the optic disc inner angle $\theta$ and the nerve fiber bundle defect index NFBD($\theta$).

Figure 28:
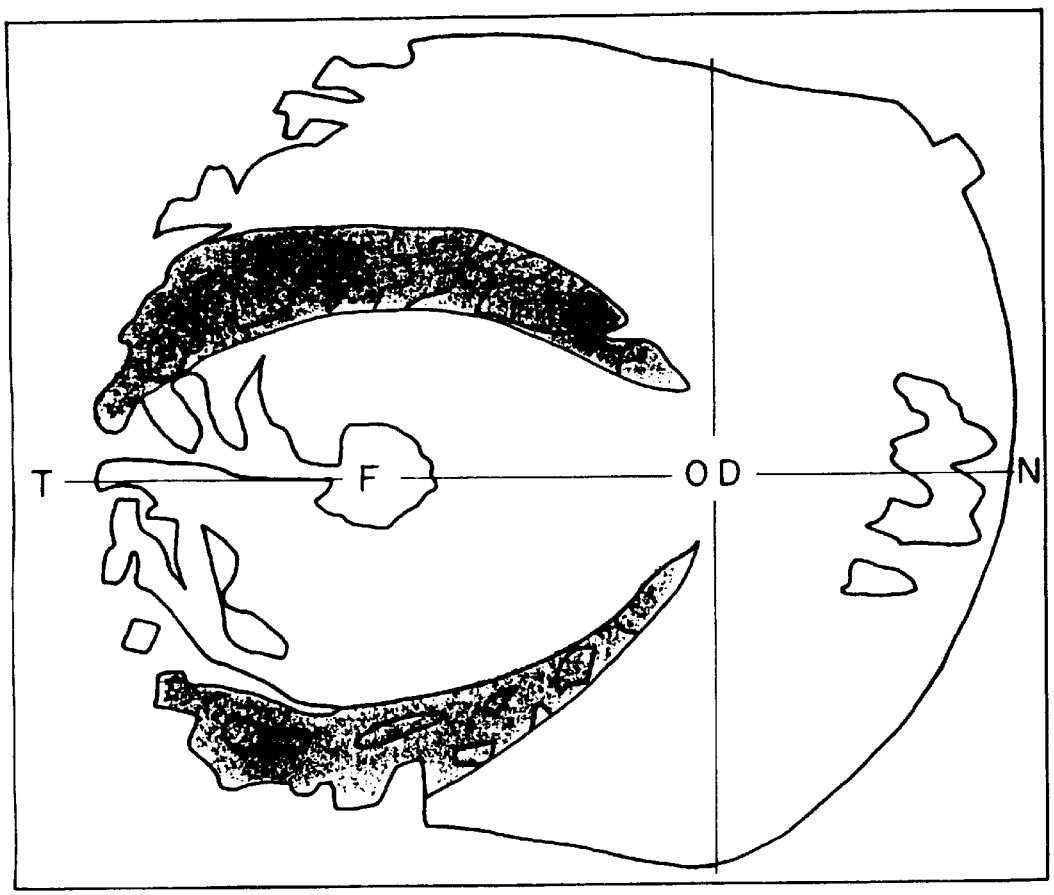
FIG. 28 is a pictorial view of the results of analysis of nerve fiber bundle defects.

In step S12, a unidirectional bridge filter is applied to the graph of the previously calculated nerve fiber bundle defect index NFBD($\theta$) to extract nerve fiber bundles showing density drops exceeding a threshold for nerve fiber bundle defects. An image of the nerve fiber bundle defects as shown in FIG. 28 is provided. In this embodiment, the unidirectional bridge filter has a width corresponding to the forty-unit $\theta$, and the threshold is twenty gradations.

In step S13, the relation between the optic disc inner angle $\theta$ and the nerve fiber bundle defect index NFBD($\theta$) determined in step S11 is stored to apply the same to the comprehensive analysis of glaucoma. The procedure ends in step S14.

E. Automatic Visual Field Analyzing Procedure

If a glaucomatous defect occurs in the nerve fiber bundles, an abnormality characteristic of the shape of the glaucomatous defect occurs in the visual field. Since the visual field test is a subjective test, the results of the visual field test unavoidably include noise. The results lack reproduceability and the visual field is determined empirically. However, the visual field test, as well as the examination of the retinal photograph, is an important means for the clinical examination of glaucoma.

Figure 34B:
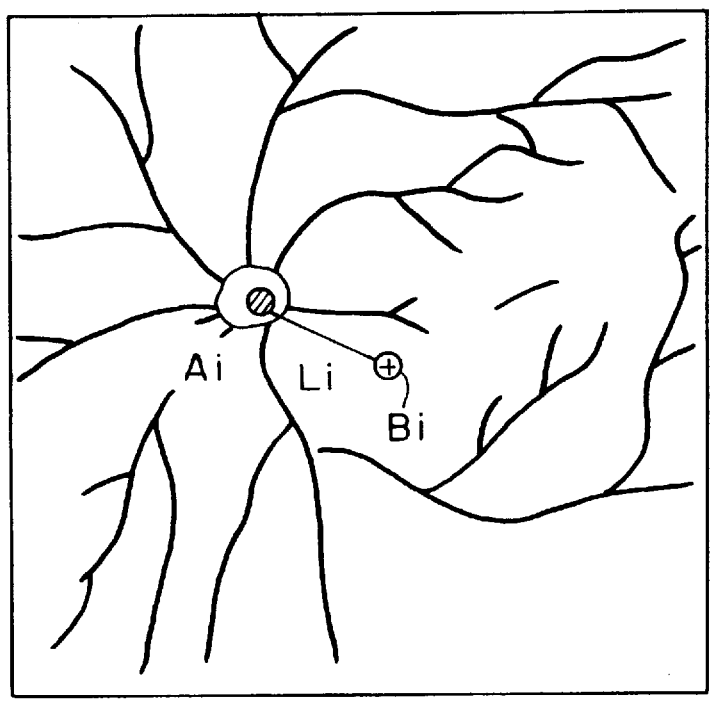
FIG. 34($a$) is a diagram formed by plotting visual field data.
Figure 34A:
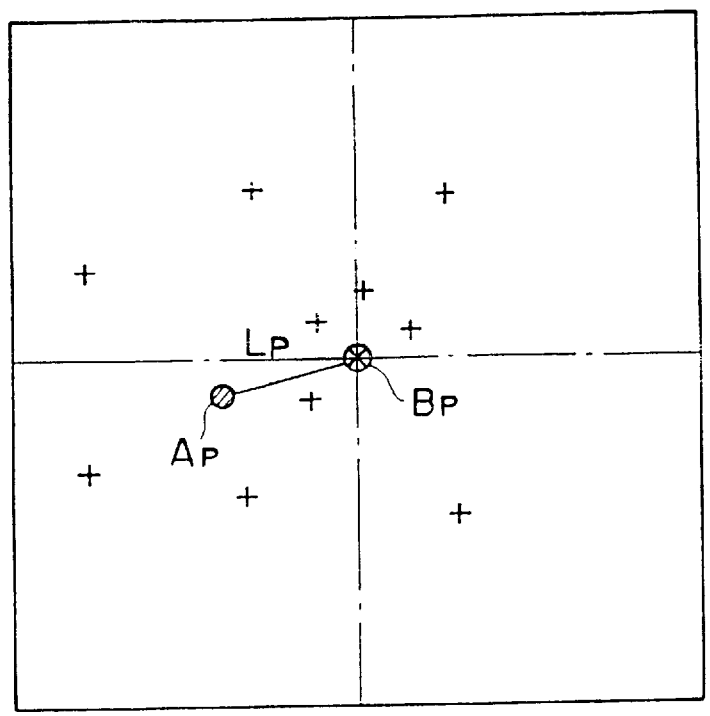

Generally, visual field data is shown on a coordinate system having its origin at the position of the visual axis (macula lutea), an abscissa axis corresponding to a horizontal line passing through the macula lutea, and an ordinate axis corresponding to a vertical line passing through the macula lutea as shown in FIG. 34(a).

On the other hand, generally, the midpoint between the center of the optic disc and the macula lutea is located at the center of the retinal image, which is different from the center of the visual field data. Therefore, it is difficult to connect the retinal image data with the visual field data with respect to position for analysis. It is an object of the present invention to analyze the visual field automatically in view of the foregoing difficulty.

An automatic visual field analyzing procedure will be described with reference to FIGS. 29(A) and 29(B).

The procedure starts in step S1, and visual field data obtained by an automatic perimeter is received in step S2. This embodiment uses the screening program of an automatic perimeter. The automatic perimeter may use a threshold measuring program or the like instead of the screening program.

In step S3, unit elements, such as the center $A_p$ of the optic disc, the position $B_p$ of the macula lutea, and the distance $L_p$ between $A_p$ and $B_p$, necessary for aligning the visual field data with the fundus coordinate system set on the retinal image are extracted. Specifically, the distance $L_p$ is determined on the assumption that the center $A_p$ of the optic disc corresponds to the position of the blind spot, and the center of the visual field corresponds to the position or $B_p$ of the macula lutea.

In step S4, the respective scales of the retinal image and the visual field data are adjusted. Specifically, if the distance $L_p$ between the center of the optic disc and the position of the macula lutea among the unit elements determined on the basis of the visual field data is different from the distance $L_i$ between the center $A_i$ of the optic disc and the position $B_i$ of the macula lutea determined on the basis of the retinal image data, the visual field data is enlarged or contracted to bring the distance $L_p$ into coincidence with the distance $L_i$. For example, the coordinates (x, y) of the visual field data are transformed into coordinates (x*(Li/Lp), y*(Li/Lp)).

In step S5, the retinal image data and the visual field data are combined so that the corresponding portions coincide with each other.

The visual field data correspond to the image reversed and inverted for the retinal image data. Thus, the visual field data are converted in rotary symmetry, the center of which is the intersection between the abscissa axis and the visual axis.

The origin of the fundus coordinate system, i.e., the center $A_i$ of the optic disc of the retinal image data, coincides with the center $A_p$ of the optic disc of the visual field data. The line connecting the center $A_i$ of the optic disc and the position $B_i$ of the macula lutea of the retinal image data is aligned with the line connecting the center $A_p$ of the optic disc and the position $B_p$ of the macula lutea of the visual field data. Thus, both the retinal image data and the visual field data are shown together on the fundus coordinate system.

Figure 35:
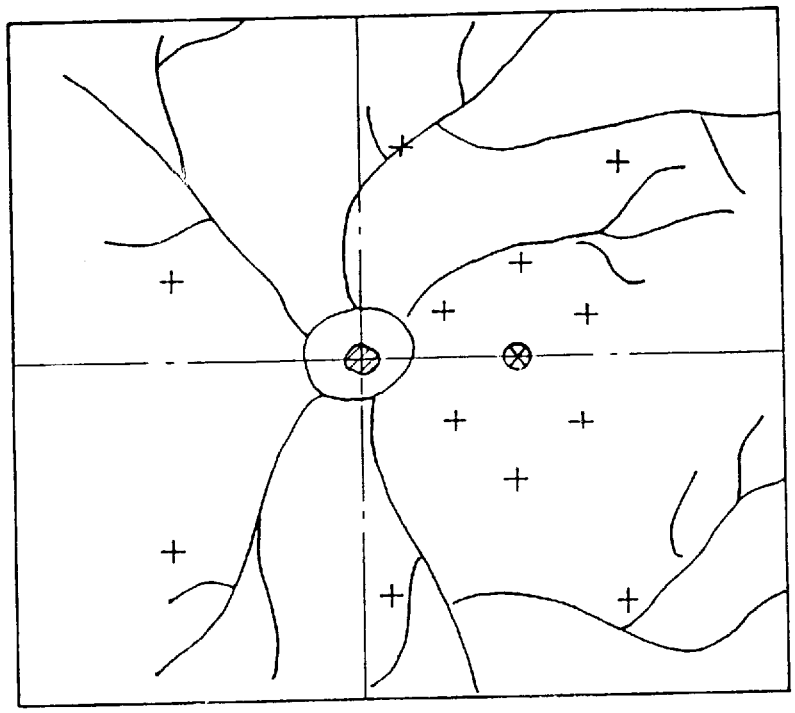
FIG. 35 is a composite picture formed by combining the visual field data and the picture of the fundus.

In step S6, image data composed by combining the retinal image data and the visual field data, which are determined individually, is displayed on the fundus coordinate system as shown in FIG. 35.

In step S7, the simulation of the nerve fiber bundles used by the automatic nerve fiber bundle defect analyzing procedure is called upon, and a coordinate system having its center at Mariotte's blind spot, an abscissa axis aligned with a line connecting the center of Mariotte's blind spot and the macula lutea, and an ordinate axis perpendicularly intersecting the abscissa axis at Mariotte's blind spot is set.

Figure 30:
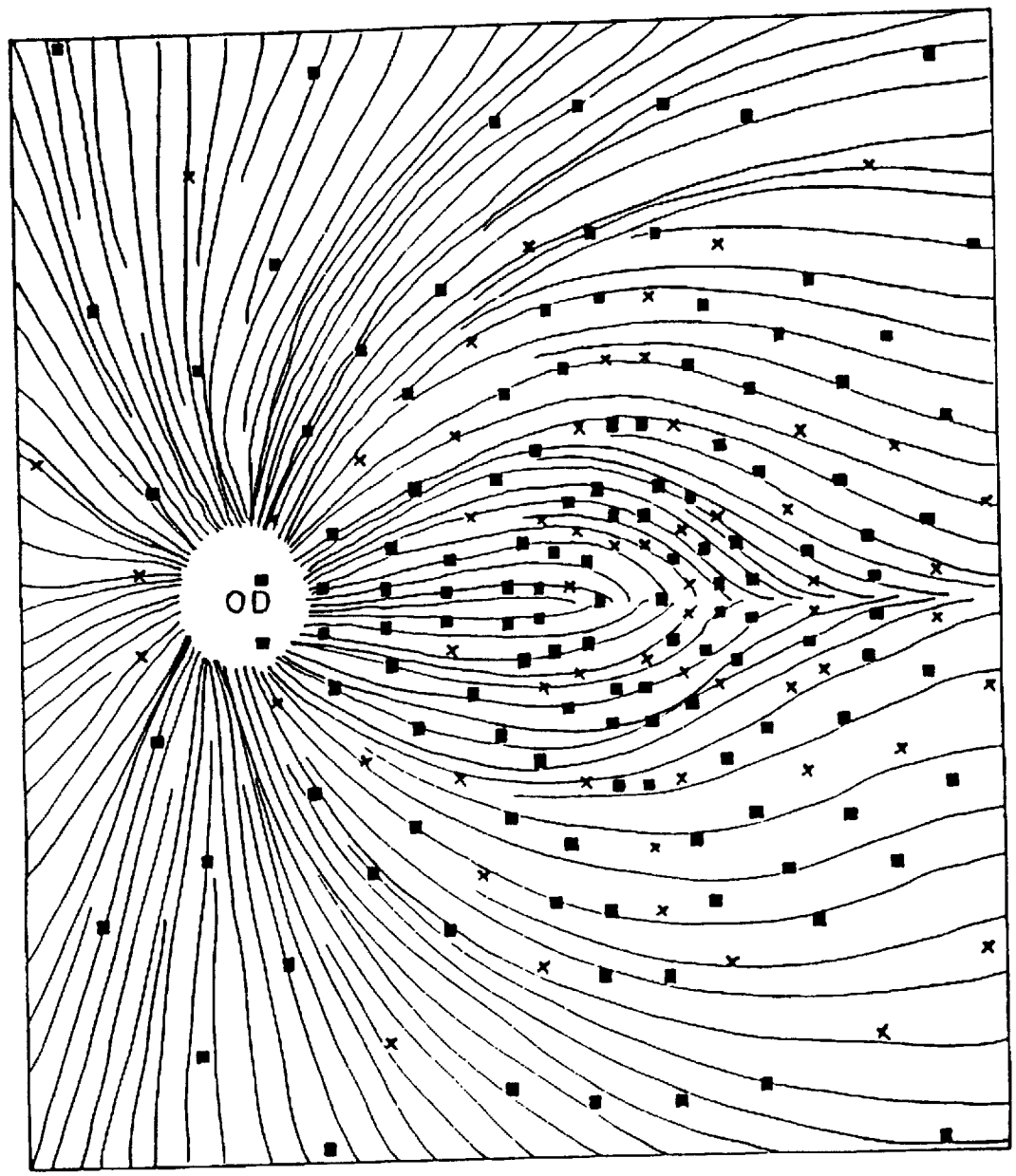
FIG. 30 is a pictorial view which is helpful in describing the relation between optic nerves extending in the direction of each optic disc inner angle $\theta$ and corresponding data of the visual field.

In step S8, the optic nerve fiber in the optic disc inner angles θ and the visual field data are combined as shown in FIG. 30. In step S9, the degree of continuous defects in the nerve fiber bundles is calculated.

For the degree of continuous defects, when each value of the nearest measuring point indicates a visual field defect, a summation formula is used. The sum is over the measuring points which appear along the arrangement of optic nerve fibers:

(degree of continuous defects)=Σ(visual field defect $(J,\theta)$*visual field defect $(J+1,\theta)$/((number of visual field data—1)*maximum visual field defect*maximum visual field defect))

In this equation, θ is the optic disc inner angle and J is the position of a visual field measuring point corresponding to the optic nerve fiber. Numbers are assigned sequentially to the positions of the visual field measuring points in order of arrangement from the center of the optic disc outward. A degree of average defect may be used instead of the degree of continuous defect.

Thus, the information about the optic nerve fibers obtained from the visual field data can be collated with the information about the inside of the optic disc by projecting the information about the optic nerve fibers on the corresponding optic disc inner angles θ to enable comprehensive analysis of glaucoma. Visual field measurement is achieved through a subjective test requiring a comparatively long measuring time. It is burdensome for the subject to endure such a long measuring time. Therefore, in most cases, visual field measurement is performed for a limited number of measuring points to lighten the burden on the subject. Hence, the number of measuring points for each optic nerve fiber is inevitably very small. Consequently, when the defect is short, the number of pieces of available data may be very small, and, in some cases, it may be impossible to calculate the continuity accurately. This embodiment uses a model of an optic nerve fiber band, namely, a collection of a number of optic nerve fibers. An increased number of visual field measuring points are allocated to the optic nerve fiber band so that data density is increased to deal with a case where defects are comparatively short.

In step S10, a band division model formed by dividing the arrangement of the nerve fiber bundles as shown in FIG. 30 is called upon by the nerve fiber bundle simulation used for visual field defect analysis. In step S11, the visual field measuring points are collated with the band division model called upon in step S10.

In step S12, calculation similar to that carried out in step S9 is carried out to calculate the degrees of continuous defects in the nerve fiber bundles of the band divisions.

For the degree of continuous defects, when each value of the nearest measuring point indicates a visual field defect, a summation formula is used. The sum is over the measuring points which appear along the arrangement of optic nerve fibers:

(degree of continuous defect)=(visual field defect $(J, \text{band})$*visual field defect $(J+1, \text{band})$/((number of visual field data—1)*maximum visual field defect*maximum visual field defect))

In this equation, "band" is equivalent to the optic disc inner angle θ corresponding to the optic nerve fiber representing each optic nerve fiber band of the nerve fiber bundle simulation used for fiber bundle nerve defect analysis. J is the position of a visual field measuring point corresponding to the optic nerve fiber band. Numbers are assigned sequentially to the positions of the visual field measuring points in order of arrangement from the center of the optic disc outward. A degree of average defect may be used instead of the degree of continuous defect.

Thus, an index indicating whether the defect in the optic nerve fiber band is continuous, i.e., an index of condition of glaucoma, can be calculated from the visual field data in step S12. An index of a continuous defect in the nerve fiber bundle is expressed by $VD(\theta)$. In step S13, information about the continuous defects in the nerve fiber bundles, the optic nerve fiber bands and the optic disc inner angles θ corresponding to the information about the continuous defects are stored for the comprehensive analysis of glaucoma. The procedure ends in step S14.

The index of continuous defects in the nerve fiber bundles discrete in angular direction may be converted into an index of continuous defects in the nerve fiber bundles continuous in angular direction by interpolation to enable the analysis of glaucoma through the analysis of the visual field alone.

F. Automatic Integrated Analysis Procedure

An automatic integrated analysis procedure will be described hereinafter with reference to FIG. 31.

The procedure starts in step S1, and information including the distance $DD(\theta)$ between the center of the optic disc and the optic disc edge for each optic disc inner angle θ, the distance $DP(\theta)$ between the center of the optic disc and the pallor for each optic disc inner angle θ, the difference between $DD(\theta)$ and $DP(\theta)$, and the ratio $DP(\theta)/DD(\theta)$ obtained by the automatic pallor analyzing procedure is received in step S2.

In step S3, information is received from the blood vessel curvature analyzing procedure. That is, the blood vessel curvature $VC(\theta)$ for each optic disc inner angle θ in which a blood vessel lies on the optic disc edge is called for.

In step S4, information is received from the automatic nerve fiber bundle defect analyzing procedure. That is, the nerve fiber bundle defect index $NFBD(\theta)$ for each optic disc inner angle θ is called for.

In step S5, information is received from the automatic visual field analyzing procedure, i.e., the degree of continuous defect for each optic disc inner angle θ corresponding to the arrangement of nerve fiber bundles in which the visual field measuring points are distributed, and the continuous defect index $VD(\theta)$ for each optic disc inner angle θ corresponding to the called-for nerve fiber bundles is obtained.

Figure 32:
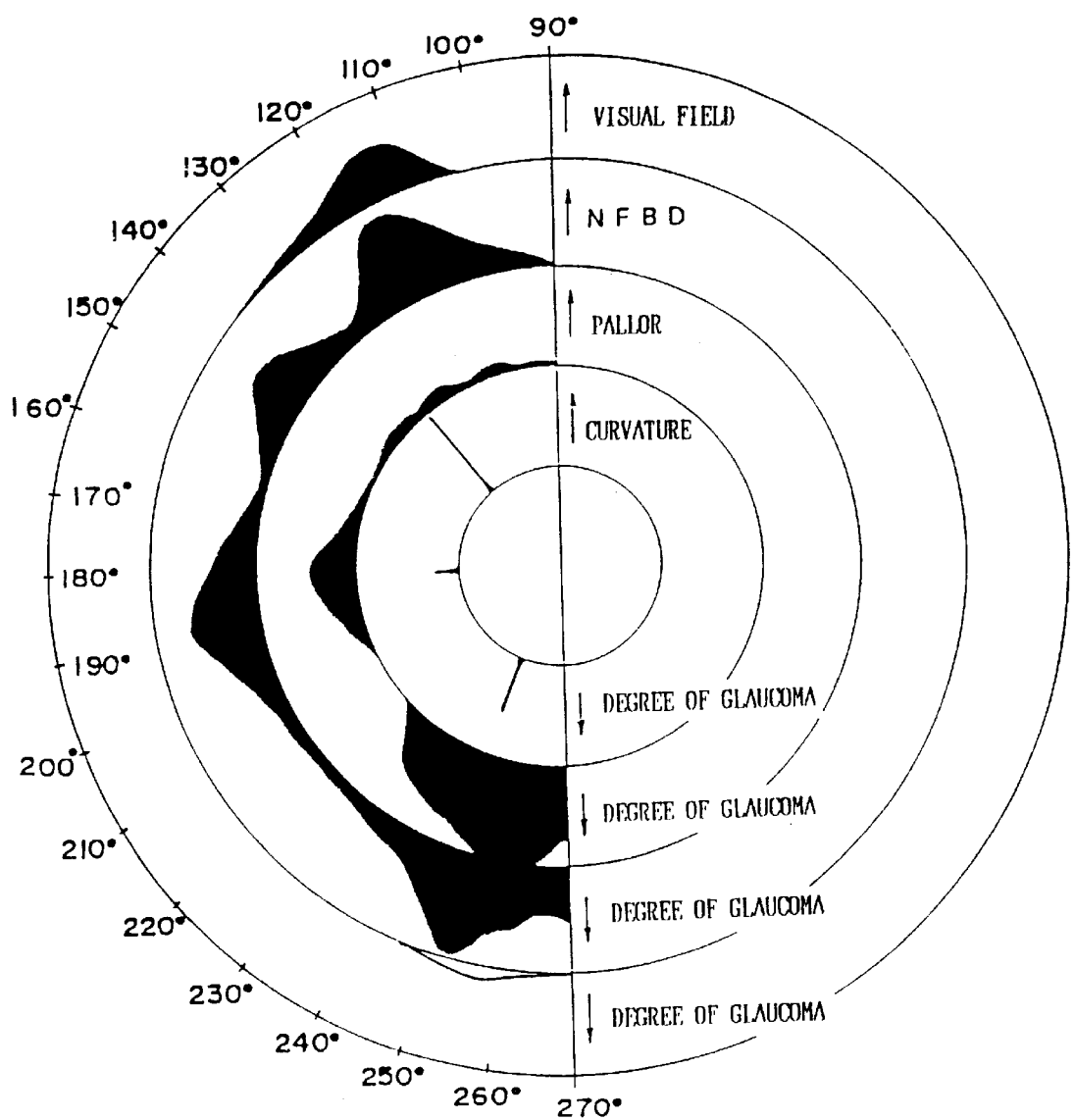
FIG. 32 is a diagrammatic view showing the results of automatic, comprehensive analysis carried out by the glaucoma analyzer of FIG. 1.

In step S6, the data indicative of the condition of glaucoma, received in steps S2 to S5 is displayed in connection with the optic disc inner angle θ as shown in FIG. 32. Directions in which defects in the nerve fiber bundles lie can be known by analogy from the degree of coincidence of the peaks of the indices indicative of glaucoma. In FIG. 32, defects in the nerve fiber bundles lie in the vicinity of the Bjerrum's area (110° to 140° and 220° to 250°). The degree of spread of the defect in the nerve fiber bundle can be known by analogy from the degree of overlap between the peaks. The degree of progress of the defects in the nerve fiber bundle can be known by analogy from the intensity of overlap between the peaks.

Thus the plurality of indices for the optic disc inner angles θ indicative of glaucoma on different coordinate systems are processed in a batch processing mode by the computer to provide unified glaucomatous observation of visual field and fundus data, which enables the analysis, of the condition of glaucoma represented by defects in the nerve fiber bundles. This is so even in a case where the symptoms of glaucoma can be barely recognized through the examination of the retinal photograph and can be poorly recognized through the examination of the visual field.

Even in a case where an ophthalmologist is unable to recognize the condition of glaucoma by observation of the visual field and the fundus, the symptom of glaucoma represented by defects in the nerve fiber bundles can be recognized by processing the retinal image. Thus, the present invention is an effective assistance to the ophthalmologist in diagnosing glaucoma. The perimeter may be a generally known automatic perimeter, a flicker perimeter for glaucoma detection, a blue pyramid perimeter or a perimeter using contrast sensitivity measurement.

In step S7, the degree of overlap between the peaks of indices indicative of glaucoma, the extent of the overlapping peaks and the intensity of overlap between the peaks are calculated automatically by a suitable method and the results of the calculation are displayed.

Operation of the Glaucoma Analyzer

Figure 33:
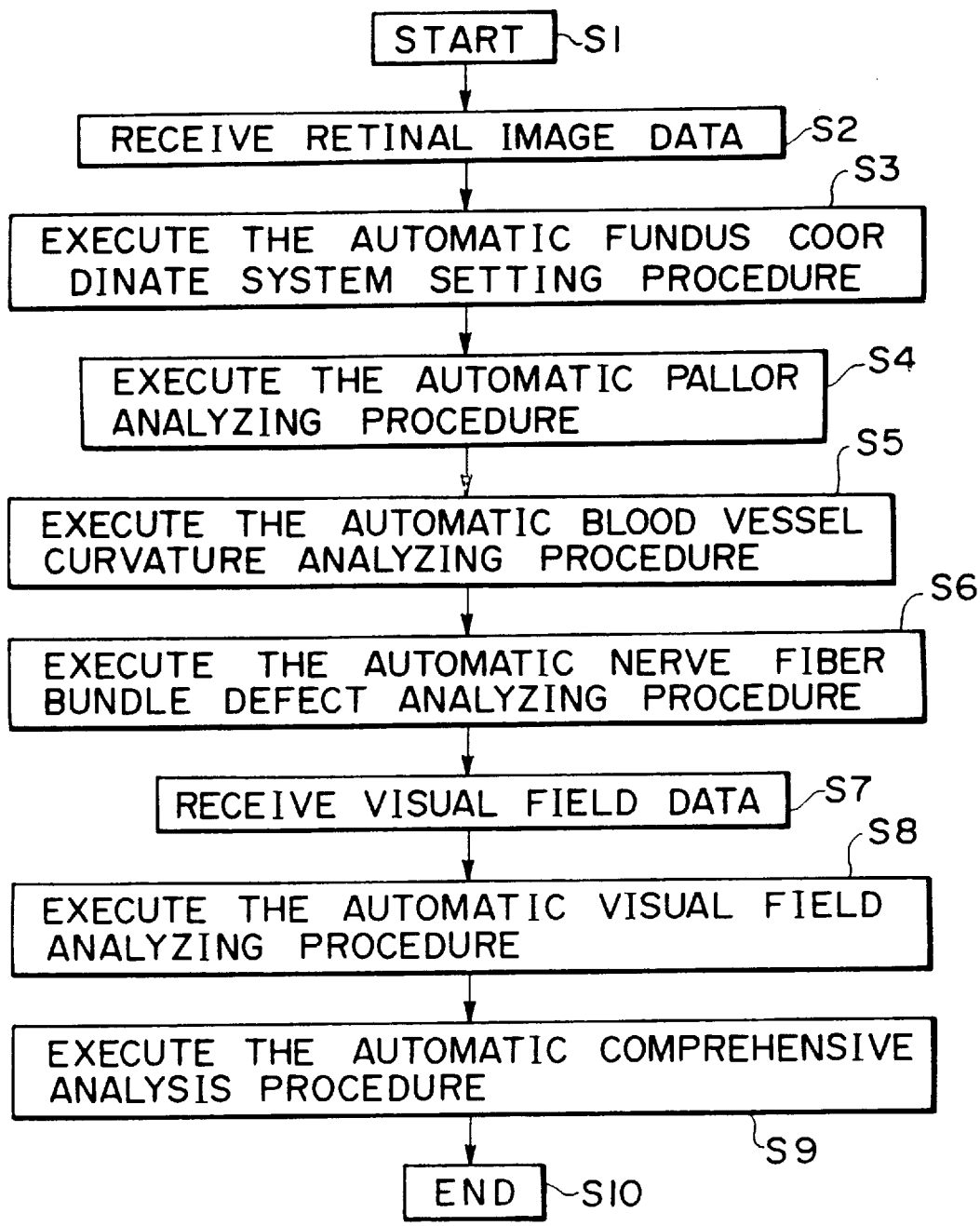
FIG. 33 is a flow chart which is helpful in describing the operation of the glaucoma analyzer of FIG. 1.

Operation of the glaucoma analyzer 1000 will be described with reference to FIG. 33. The perimeter 2000 and the retinal camera 3000, i.e., a retinal photographing means, are connected to the glaucoma analyzer 1000.

At the start of the analyzing operation, in step S1, the data processing unit 100 reads programs from the program memory 200. In step S2, the glaucoma analyzer 1000 receives a retinal image of the subject's retina from the retinal camera 300 provided with a CCD as an image sensor. The image data provided by the retinal camera 3000 is transmitted to the glaucoma analyzer 1000 in analog signals or in digital signals obtained by converting the analog signals with an A/D converter. The data processing unit 100 has an interface, i.e., a retinal image data input unit, for receiving the image signals from the retinal camera 3000. The retinal camera 3000 and the interface constitute a retinal image data producing unit.

In step S3, the data processing unit 100 executes the automatic fundus coordinate system setting procedure including the optic disc detecting procedure (FIG. 4), the macula lutea detecting procedure (FIG. 14) and a fundus coordinate system setting procedure. The feature extracting unit 110 of the data processing unit 100 operates for data processing. The results of data processing operation are stored in the data memory 300.

Figure 19A:
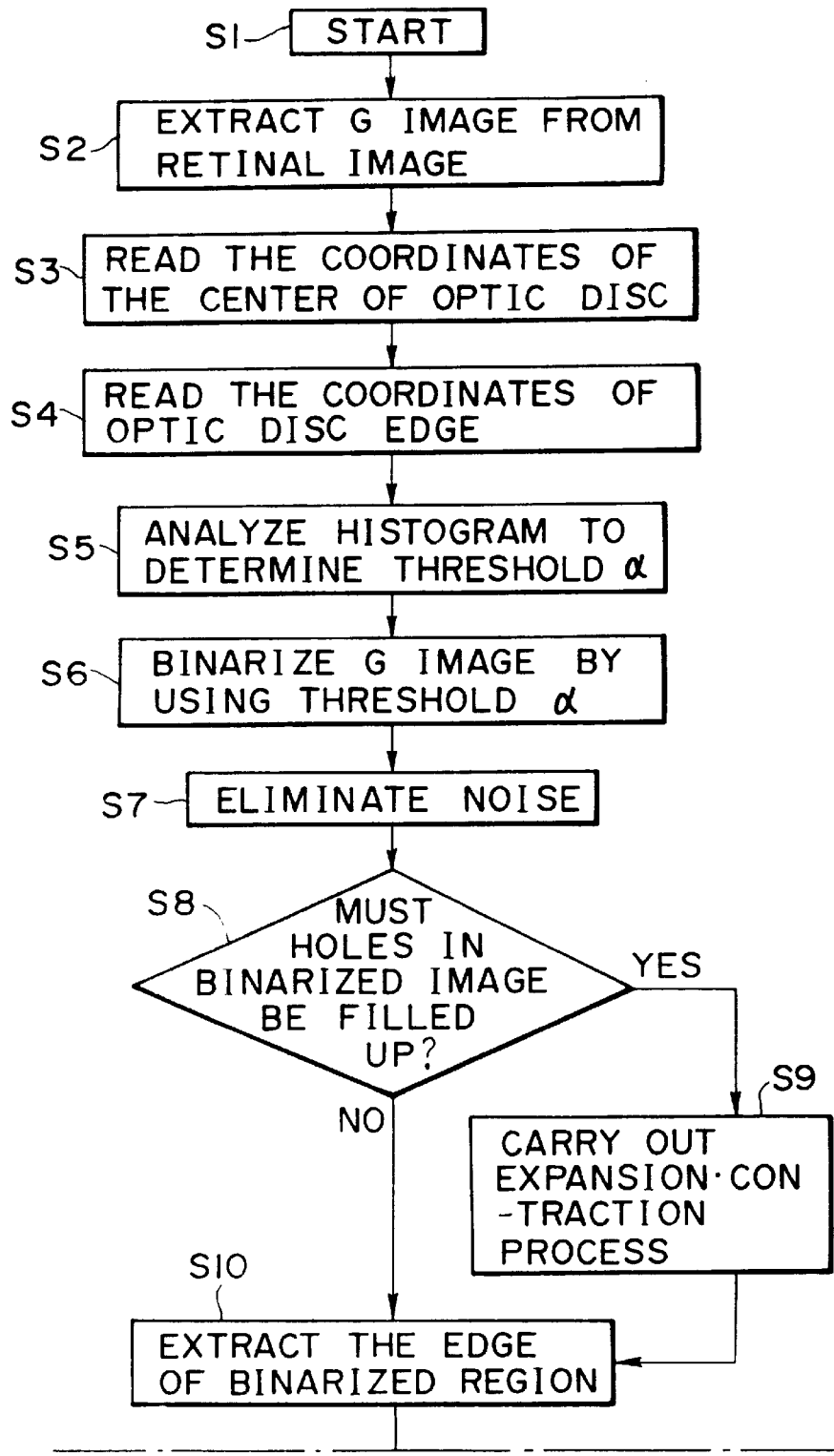
FIGS. 19(A) and 19(B) constitute a flow chart of an automatic pallor analyzing procedure to be carried out by the glaucoma analyzer of FIG. 1.
Figure 19B:
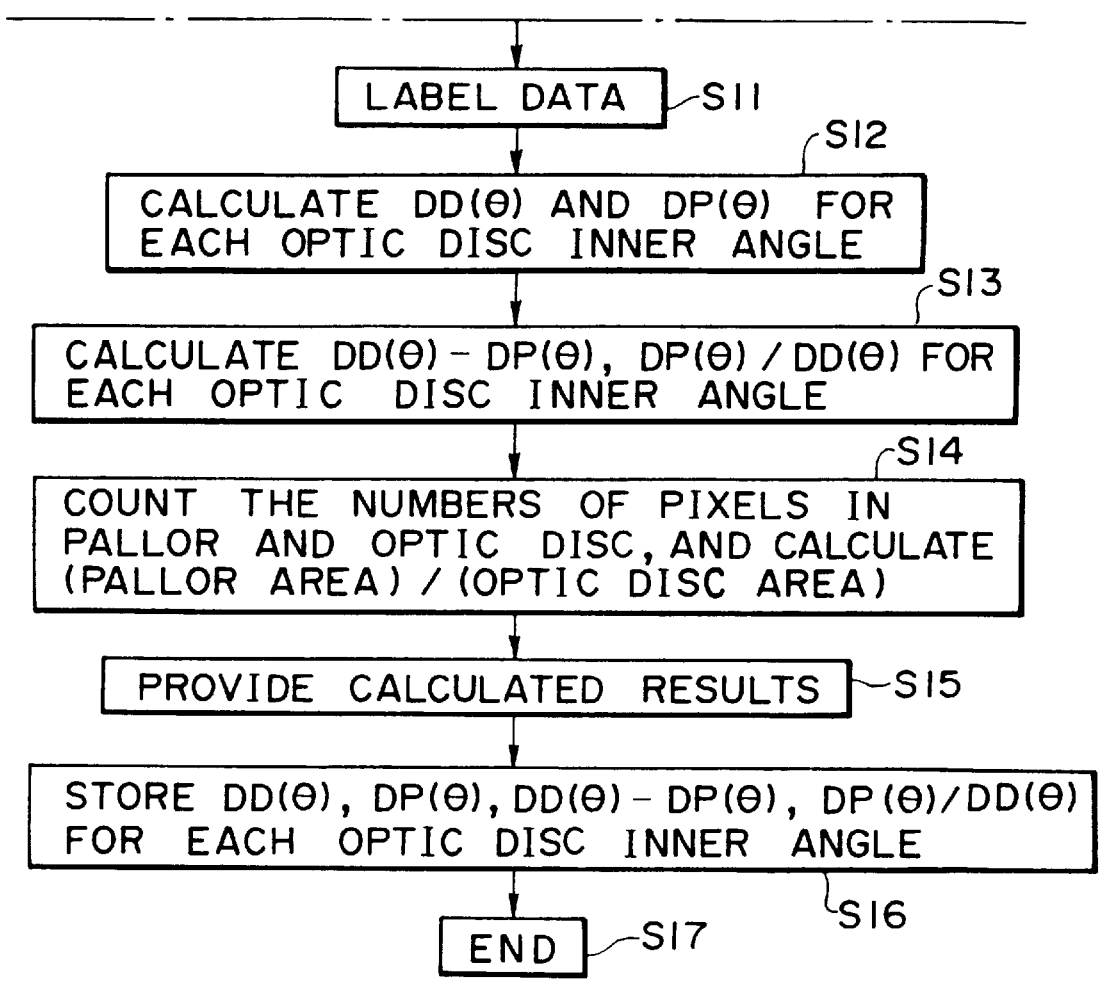

In step S4, the data processing unit 100 executes the automatic pallor analyzing procedure including steps shown in FIGS. 19(A) and 19(B) to detect the pallor, and stores DD(θ)–DP(θ), DP(θ)/DD(θ), DD(θ) and DP(θ) in the data memory 300.

Figure 21B:
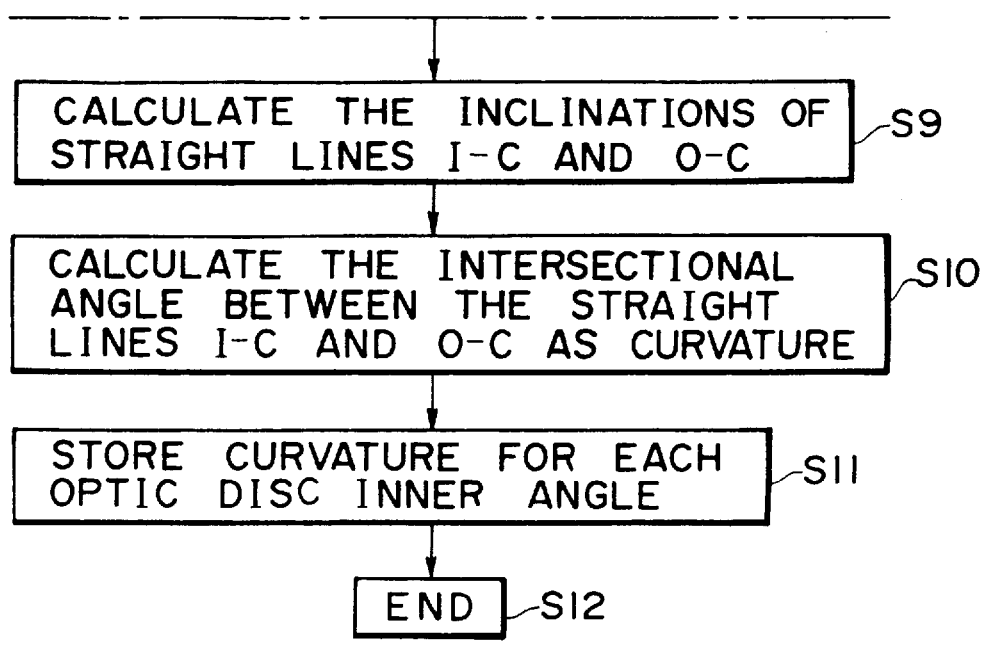

In step S5, the data processing unit 100 executes the automatic blood vessel curvature analyzing procedure comprising steps shown in FIGS. 21(A) and 21(B) to calculate the curvatures of blood vessels extending around the optic disc edge. The calculated curvatures VC(θ) are stored in the data memory 300.

In step S6, the data processing unit 100 executes the automatic nerve fiber bundle defect analyzing procedure comprising steps shown in FIGS. 23(*a*)(A), 23(*a*)(B) and 23(*b*) to detect defects in the nerve fiber bundles. The automatic nerve fiber bundle defect analyzing procedure reads the coordinates of the center of the optic disc and that of the center of the macula lutea provided by the automatic fundus coordinate system setting procedure, sets a coordinate system having its origin at the center of the optic disc, an abscissa axis corresponding to a line connecting the optic disc and the macula lutea, and an ordinate axis perpendicularly intersecting the abscissa axis at the origin, and simulates Hogan's optic nerve fiber arrangement on the coordinate system. The coordinate system is determined by a fundus coordinate system determining unit 120 that determines the fundus coordinate system on the basis of the distribution pattern of predetermined nerve fiber bundles and the respective positions of the optic disc and the macula lutea. The indices NFBD(θ) indicating the defects in the nerve fiber bundles calculated by the automatic nerve fiber bundle defect analyzing procedure are stored in the data memory 300.

In step S7, the data processing unit 100 receives the visual field data of the subject from the perimeter 2000. The perimeter 2000 employed in the embodiment is an automatic perimeter and the visual field data is given to the glaucoma analyzer 1000 according to a suitable protocol.

Figures 29, 29A, 29B:
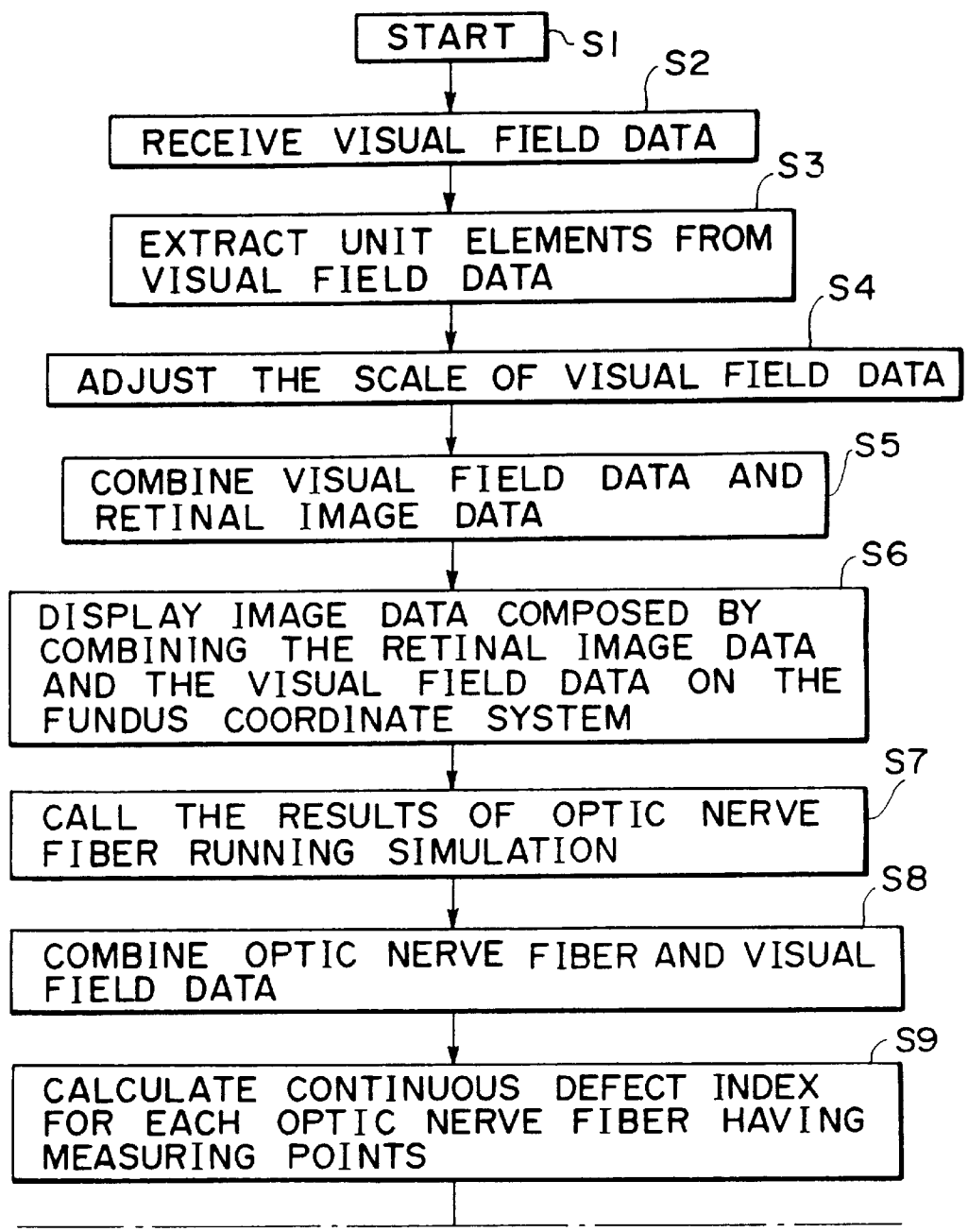
FIGS. 29(A) and 29(B) constitute a flow chart of an automatic visual field analyzing procedure to be carried out by the glaucoma analyzer of FIG. 1.

In step S8, the data processing unit 100 executes the automatic visual field analyzing procedure comprising steps shown in FIGS. 29(A) and 29(B). Optic nerves data in the optic disc inner angles θ are matched with visual field data and the continuous defect indices VD(θ) of the nerve fiber bundles are calculated and stored in the data memory 300. The automatic visual field analyzing procedure is carried out by a visual field data transforming unit 130.

The automatic pallor analyzing procedure and the automatic blood vessel curvature analyzing procedure are carried out by a feature extracting unit 120 that extracts features indicative of retinal diseases from the retinal image data.

Figure 31:
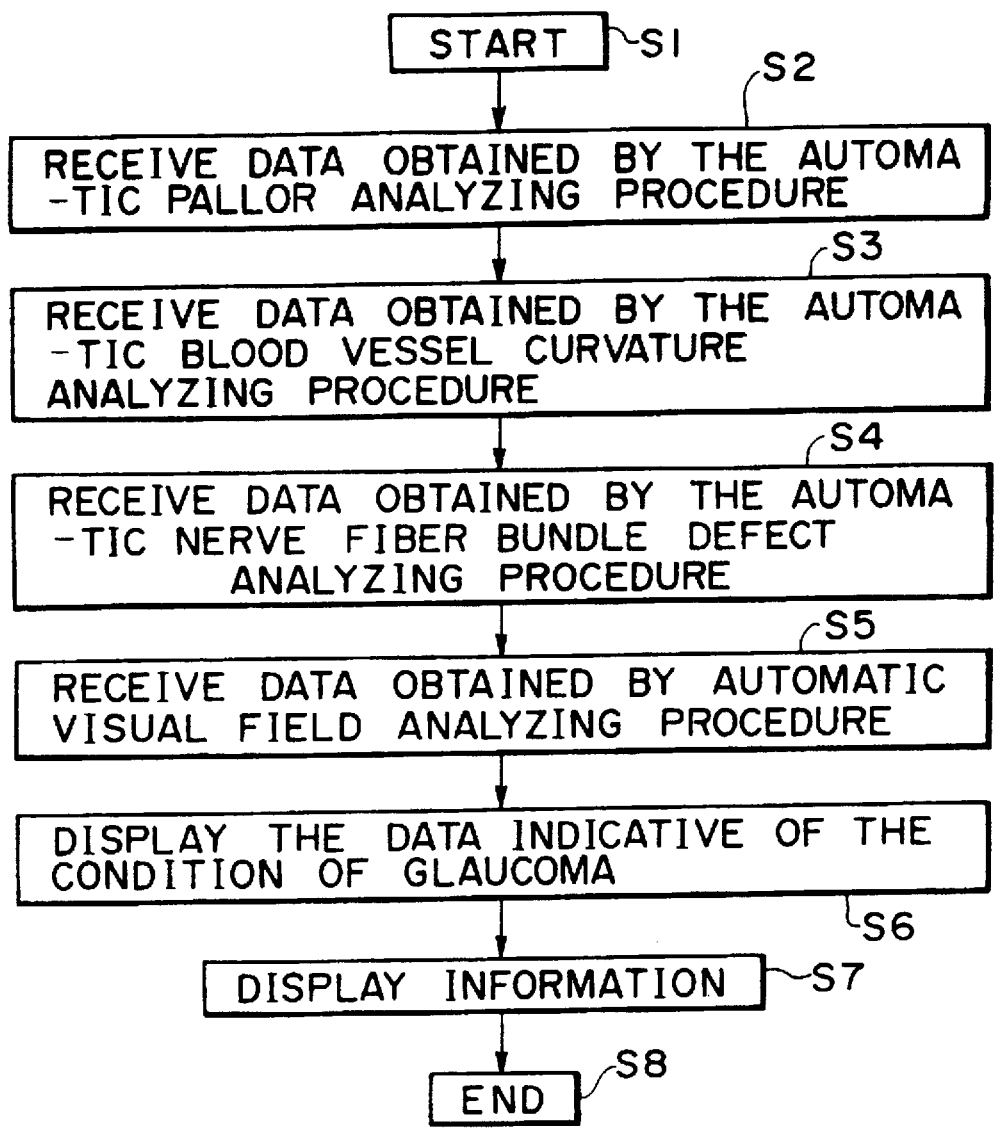
FIG. 31 is a flow chart of a procedure for automatic, comprehensive analysis to be carried out by the glaucoma analyzer of FIG. 1.

In step S9, the data processing unit 100 executes the automatic integrated analysis procedure comprising steps shown in FIG. 31 and displays data indicative of glaucoma. The degree of overlap between the peaks of the glaucoma indices, the extent of overlap between the peaks and the intensity of overlap of the peaks are calculated automatically by a suitable calculating method and the calculated data is displayed. The displayed data assists the ophthalmologist in recognizing the condition and the degree of progress of glaucoma. The automatic integrated diagnosis procedure is carried out by an analyzing unit 150 that connects the visual field data with the features on the fundus coordinate system and analyzes for retinal diseases. The automatic integrated analysis procedure calls upon the automatic visual field analyzing procedure and integrates the retinal image data along the directions of the optic nerve fiber to calculate the continuous defect indices. The analysis of the continuous defect indices is one of the factors for analysis.

In step S10, the glaucoma analyzer 1000 terminates the operation for analyzing glaucoma.

The present invention is not limited in its application to the analysis of glaucoma and may be applied to the analysis of other diseases and complications developed in the course of glaucoma.

What is claimed is:

1. A retinal disease analyzer comprising:
   a feature extracting unit for determining macula-lutea and optic-disc positions from retinal image data of a subject;
   a fundus coordinate system setting unit operatively connected to the feature extracting unit for setting a fundus coordinate system based on a predetermined optic nerve fiber bundle distribution pattern and the macula-lutea and optic-disc positions;
   a visual field data transforming unit operatively connected to the fundus coordinate system setting unit for transforming measured visual field data based on the fundus coordinate system;
   a defect extracting unit for extracting data of defects caused by a retinal disease from the retinal image data; and
   an analyzing unit operatively connected to the visual field data transforming unit and the defect extracting unit for relating the transformed visual field data to the data of defects, for retinal disease analysis.

2. A retinal disease analyzer comprising:
   a feature extracting unit for determining macula-lutea and optic-disc positions from retinal image data of a subject;
   a nerve fiber bundle distribution pattern forming unit operatively connected to the feature extracting unit for forming a distribution pattern of the subject's optic nerve fiber bundles based on the macula-lutea and optic-disc positions;
   a visual field data transforming unit for transforming measured visual field data based on a fundus coordinate system;
   a defect extracting unit for extracting data of defects caused by a fundus disease from the retinal image data; and
   an analyzing unit operatively connected to the nerve fiber bundle distribution pattern forming unit, the visual field data transforming unit and the defect extracting unit for relating the transformed visual field data to the data of defects based on the optic nerve fiber bundle distribution pattern, for retinal disease analysis.

3. The retinal disease analyzer according to claim 1 or 2, wherein the defect extracting unit comprises:
   computer memory instructed for extracting data of pallor of the subject from the retinal image data;
   computer memory instructed for determining an optic-disc pallor dislocation distribution;
   computer memory instructed for calculating curvatures of blood vessels extending around an optic-disc edge based on the retinal image data;
   computer memory instructed for determining average density of the retinal image data along the subject's optic nerve fiber bundles; and
   computer memory instructed for calculating optic nerve fiber bundle defect indices.

4. The retinal disease analyzer according to claim 1, wherein the fundus coordinate system setting unit comprises computer memory instructed for determining the fundus coordinate system as a curvilinear coordinate system with reference to the predetermined optic nerve fiber bundle distribution pattern, and so that the fundus coordinate system has its origin at the optic-disc position and is scaled by optic-disc inner angles.

5. A retinal disease analyzer comprising:
   a feature extracting unit for determining macula-lutea and optic-disc positions from retinal image data of a subject;
   a fundus coordinate system setting unit operatively connected to the feature extracting unit for setting a fundus coordinate system based on a predetermined optic nerve fiber bundle distribution pattern and the macula-lutea and optic-disc positions;
   a defect extracting unit for extracting data of defects caused by a retinal disease from the retinal image data; and
   an analyzing unit operatively connected to the visual field data transforming unit and the defect extracting unit for relating the transformed visual field data to the data of defects, for retinal disease analysis.

6. A retinal disease analyzer comprising:
   a feature extracting unit for determining macula-lutea and optic-disc positions from retinal image data of a subject;
   a nerve fiber bundle distribution pattern forming unit operatively connected to the feature extracting unit for forming a distribution pattern of the subject's optic nerve fiber bundles based on the macula-lutea and optic-disc positions;
   a defect extracting unit operatively connected to the nerve fiber bundle distribution pattern forming unit for extracting data of defects caused by a retinal disease from the retinal image data based on the optic nerve fiber bundle distribution pattern; and
   an analyzing unit operatively connected to the defect extracting unit for analyzing retinal disease based on the extracted data of defects.

7. The retinal disease analyzer according to claim 5 or 6, wherein the defect extracting unit comprises computer memory instructed for extracting the data of defects by connecting the retinal image data with directions of optic nerve fibers.

8. A retinal disease analyzer comprising:
   a feature extracting unit for determining macula-lutea and optic-disc positions from retinal image data of a subject;
   a fundus coordinate system setting unit operatively connected to the feature extracting unit for setting a fundus coordinate system based on a predetermined optic nerve fiber bundle distribution pattern and the macula-lutea and optic-disc positions;
   a defect extracting unit for extracting data of defects caused by a retinal disease from the retinal image data; and
   an analyzing unit operatively connected to the fundus coordinate system setting unit and the defect extracting unit for mutually relating the data of defects on the fundus coordinate system, for retinal disease analysis.

9. A retinal disease analyzer comprising:
   a feature extracting unit for determining macula-lutea and optic-disc positions from retinal image data of a subject;
   a nerve fiber bundle distribution pattern forming unit operatively connected to the feature extracting unit for forming a distribution pattern of the subject's optic nerve fiber bundles based on the macula-lutea and optic-disc positions;
   a defect extracting unit for extracting data of defects caused by a fundus disease from the retinal image data; and an analyzing unit operatively connected to the nerve fiber bundle distribution pattern forming unit and the defect extracting unit for mutually relating the data of defects based on the optic nerve fiber bundle distribution pattern, for retinal disease analysis.

10. The retinal disease analyzer according to claim 8 or 9, wherein the data of defects comprises a direction of pallor expansion, curvatures of blood vessels extending around an optic-disc edge, and defects in the subject's optic nerve fiber bundles.

11. In a retinal disease analyzer:
a feature extracting unit for determining macula-lutea and optic-disc positions from retinal image data of a subject; and
a nerve fiber bundle distribution pattern forming unit operatively connected to the feature extracting unit for forming a distribution pattern of the subject's optic nerve fiber bundles based on the macula-lutea and optic-disc positions.

12. In a retinal disease analyzer:
a feature extracting unit for determining macula-lutea and optic-disc positions from retinal image data of a subject; and
a fundus coordinate system setting unit operatively connected to the feature extracting unit for setting a fundus coordinate system based on a predetermined optic nerve fiber bundle distribution pattern and the macula-lutea and optic-disc positions.

13. In the retinal disease analyzer according to claim 12 or 11, the feature extracting unit comprising computer memory instructed for extracting data of blood vessels and determining, as the optic-disc position, a position on which the blood vessels converge.

14. In the retinal disease analyzer according to claim 12 or 11, the feature extracting unit comprising computer memory instructed for detecting the optic-disc position based on intensity and saturation of the retinal image.

15. In the retinal disease analyzer according to claim 12 or 11, the feature extracting unit comprising computer memory instructed for determining an optic-disc edge based on a red-component decrease in the retinal image.

16. In the retinal disease analyzer according to claim 12 or 11, the feature extracting unit comprising computer memory instructed for determining changes in tone with reference to optic-disc image tone and for extracting, as macula lutea, a circular retinal range where tone decreases linearly.

17. In the retinal disease analyzer according to claim 12, the fundus coordinate system setting unit comprising computer memory instructed for setting the fundus coordinate system with its origin located optic-disc-centrally, for setting the fundus coordinate system as a curvilinear coordinate system, and for scaling a predetermined optic nerve fiber bundle distribution pattern according to the macula-lutea and optic-disc positions.

* * * * *

UNITED STATES PATENT AND TRADEMARK OFFICE
CERTIFICATE OF CORRECTION

PATENT NO. : 5,868,134

DATED : February 9, 1999

INVENTOR(S) : Sugiyama et al.

It is certified that error appears in the above-identified patent and that said Letters Patent is hereby corrected as shown below:

Column 26, lines 13-14, "the visual field data transforming unit and" should be deleted;

Column 26, lines 15-16, "relating the transformed visual field data to the data of defects, for retinal disease analysis" should be deleted and -- analyzing retinal disease based on the extracted data of defects. -- should be substituted therefor.

Signed and Sealed this

First Day of August, 2000

*Attest:*

Q. TODD DICKINSON

*Attesting Officer*      *Director of Patents and Trademarks*